United States Patent
Kosalla et al.

(10) Patent No.: US 10,562,292 B2
(45) Date of Patent: Feb. 18, 2020

(54) METHOD AND DEVICE FOR APPLYING A FILM

(71) Applicant: LEONHARD KURZ Stiftung & Co. KG, Furth (DE)

(72) Inventors: Konstantin Kosalla, Nuremberg (DE); Ulrike Plaia, Veitsbronn (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 0 days.

(21) Appl. No.: 15/559,997

(22) PCT Filed: Mar. 4, 2016

(86) PCT No.: PCT/EP2016/054701
§ 371 (c)(1),
(2) Date: Sep. 20, 2017

(87) PCT Pub. No.: WO2016/150681
PCT Pub. Date: Sep. 29, 2016

(65) Prior Publication Data
US 2018/0072045 A1    Mar. 15, 2018

(30) Foreign Application Priority Data

Mar. 23, 2015 (DE) .................. 10 2015 104 321
Dec. 18, 2015 (DE) .................. 10 2015 122 178

(51) Int. Cl.
*B41F 19/00* (2006.01)
*B44C 1/10* (2006.01)
(Continued)

(52) U.S. Cl.
CPC ........ *B41F 19/004* (2013.01); *B32B 37/1284* (2013.01); *B32B 38/0008* (2013.01);
(Continued)

(58) Field of Classification Search
CPC . B32B 37/1284; B32B 38/0008; B32B 38/10; B41J 11/0015; B41J 2/01;
(Continued)

(56) References Cited

U.S. PATENT DOCUMENTS 4,605,939 A * 8/1986 Hubbard .................. B41J 2/145
310/331
9,475,277 B2 * 10/2016 Ohnishi ..................... B41J 2/01
(Continued)

FOREIGN PATENT DOCUMENTS

CN          203391457 U      1/2014
CN          103946034 A      7/2014
(Continued)

OTHER PUBLICATIONS

English translation of WO2014/005823.*
(Continued)

*Primary Examiner* — Sonya M Sengupta
(74) *Attorney, Agent, or Firm* — Hoffmann & Baron, LLP

(57) ABSTRACT

A method for applying a transfer ply of a foil to a substrate, with the steps of:
  a) applying a radically curable adhesive to at least one subregion of the transfer ply by means of an inkjet printhead;
  b) pre-curing the adhesive by UV irradiation;
  c) applying the at least one subregion of the transfer ply provided with adhesive to the substrate;
  d) fully curing the adhesive by UV irradiation;
  e) peeling a carrier ply of the foil from the at least one subregion of the transfer ply.
An application apparatus and also printing apparatus for implementing such a method.

98 Claims, 8 Drawing Sheets

(51) Int. Cl.
  *B44C 1/14* (2006.01)
  *B32B 37/12* (2006.01)
  *B32B 38/00* (2006.01)
  *B32B 38/10* (2006.01)
  *B41J 11/00* (2006.01)
  *B41J 2/01* (2006.01)
(52) U.S. Cl.
  CPC ............ *B32B 38/10* (2013.01); *B41J 11/0015* (2013.01); *B44C 1/105* (2013.01); *B44C 1/14* (2013.01); *B41J 2/01* (2013.01)
(58) Field of Classification Search
  CPC ...... B41F 19/004; B41F 19/005; B44C 1/105; B44C 1/14; B44C 1/16
  USPC ............................ 156/230, 247, 275.5, 275.7
  See application file for complete search history.

(56) References Cited

U.S. PATENT DOCUMENTS

| | | | |
|---|---|---|---|
| 9,487,027 B1 | 11/2016 | Strater, Jr. et al. | |
| 2003/0020783 A1* | 1/2003 | Sanada | B41J 2/14 347/40 |
| 2005/0167035 A1 | 8/2005 | Laskey et al. | |
| 2005/0285896 A1* | 12/2005 | Hori | B41J 2/145 347/40 |
| 2007/0070108 A1* | 3/2007 | Mantell | B41J 2/2139 347/19 |
| 2010/0065193 A1 | 3/2010 | Puschel et al. | |
| 2013/0342614 A1* | 12/2013 | Nakamura | B41J 2/14274 347/71 |
| 2014/0020749 A1* | 1/2014 | Lacrampe | B29C 55/023 136/256 |
| 2014/0305577 A1 | 10/2014 | Barth | |
| 2015/0145936 A1 | 5/2015 | Plaia et al. | |
| 2018/0215190 A1* | 8/2018 | Reuther | B32B 7/06 |
| 2018/0311997 A1* | 11/2018 | Triepel | B41F 19/004 |

FOREIGN PATENT DOCUMENTS

| | | |
|---|---|---|
| DE | 3924848 | 8/1990 |
| EP | 0269287 | 6/1988 |
| EP | 2163394 | 3/2010 |
| EP | 2172347 | 4/2010 |
| JP | 2009226863 | 10/2009 |
| WO | WO2008080486 | 7/2008 |
| WO | WO2011064670 | 6/2011 |
| WO | WO2014005823 | 1/2014 |

OTHER PUBLICATIONS

English translation of EP2172347.*
English translation of EP0269287.*
English translation of DE3924848.*
English translation of JP2009-226863.*
Chinese Office Action from corresponding Chinese Patent Application No. 201680023774.3, pp. 1-13 (dated Jan. 28, 2019).

* cited by examiner

METHOD AND DEVICE FOR APPLYING A FILM

This application claims priority based on an International Application filed under the Patent Cooperation Treaty, PCT/EP2016/054701, filed Mar. 4, 2016, which claims priority to DE102015104321.1, filed Mar. 23, 2015 and DE102015122178.0, filed Dec. 18, 2015.

BACKGROUND OF THE INVENTION

The invention relates to a method and to an application apparatus for applying a transfer ply of a foil to a substrate, and also to a printing apparatus featuring an application apparatus of this kind.

The coating of foils or substrates by digital printing techniques for foil application serves to generate additional decorative effects. It typically involves the application of a cationically curing adhesive directly to the substrate or the foil by means of inkjet printing. The adhesive is solidified by means of a drier unit operating cationically. Mediated by the adhesive, the layers of the foil to be applied adhere to the substrate and are subsequently detached from a carrier ply of the foil. A known alternative to this is to use xerographic printing techniques to apply a thermoplastic toner to the substrate. On application by means of pressure and heat, and mediated by the toner which melts as a result, the layers of the foil to be applied adhere to the substrate and are subsequently detached from a carrier ply of the foil.

On inkjet printing of the adhesive directly onto the substrate, with subsequent foil application, an acceptable quality cannot be produced, owing to the adhesive running and being drawn under suction into the substrate. Foil application under pressure with a press roll exacerbates this situation. Because of the pressure and the running of the adhesive, fissured foil edges are produced on the substrate. The foil topping, moreover, often has holes in it. The gloss of the foil surface following application to the substrate is heavily dependent on the nature of the substrate surface. On nonabsorbent substrates, examples being plastics such as PE, PP or PET, the adhesive is quickly displaced widthwise by the press roll. Overall, therefore, it is usually not possible to ensure high-resolution foil application with precise edges.

SUMMARY OF THE INVENTION

It is an object of the present invention to provide a method, an application apparatus, and a printing apparatus which enable high-grade foil application.

This object is achieved by means of a method having the features of claim 1, a method having the features of claim 3, an application apparatus having the features of claim 49, an application apparatus having the features of claim 50, and a printing apparatus having the features of claim 69.

A method of this kind for applying a transfer ply of a foil to a substrate comprises the following steps:

a) applying a radically curable adhesive to at least one subregion of the transfer ply by means of an inkjet printhead;
b) pre-curing the adhesive by UV irradiation;
c) applying the at least one subregion of the transfer ply provided with adhesive to the substrate;
d) fully curing the adhesive by UV irradiation;
e) peeling a carrier ply of the foil from the at least one subregion of the transfer ply.

An alternative method for applying a transfer ply of a foil to a substrate comprises the steps of:

a) applying a thermoplastic toner to at least one subregion of the substrate and/or to at least one subregion of the transfer ply;
b) applying the transfer ply to the substrate;
c) causing an applied pressure, and heat, to act on the transfer ply and/or the substrate;
d) peeling a carrier ply of the foil from the at least one subregion of the transfer ply.

Apparatus suitable for performing such a method is an application apparatus for applying a transfer ply of a foil to a substrate, comprising the following components:

a supply roller for providing the foil;
an inkjet printhead disposed downstream of the supply roller in the conveying direction of the foil, for applying a radically curable adhesive to at least one subregion of the transfer ply, and/or a printing apparatus for applying a thermoplastic toner to at least one subregion of the substrate and/or transfer ply;
optionally a first UV light source, disposed downstream of the inkjet printhead in the conveying direction of the foil, for pre-curing the adhesive by UV irradiation;
at least one roll arrangement, disposed downstream of the inkjet printhead and/or of the printing apparatus in the conveying direction of the foil, for applying the at least one subregion of the transfer ply provided with adhesive to the substrate;
optionally a second UV light source, disposed downstream of the roll arrangement in the conveying direction of the foil, for fully curing the adhesive by UV irradiation;
a peeling unit disposed downstream of the roll arrangement in the conveying direction of the foil, for peeling a carrier ply of the foil from the at least one subregion of the transfer ply.

An application apparatus of this kind can be integrated into a printing apparatus having an inkjet printhead which is disposed movably in two orthogonal directions relative to a substrate to be printed, with the application apparatus likewise being disposed movably in two orthogonal directions relative to the substrate to be printed.

The application of the adhesive to the transfer ply of the foil improves the quality of foil application. More particularly it is possible by this means to avoid problems which arise typically during direct application of adhesive to the substrate. Thus the transfer ply can be optimized for adhesive application by a suitable primer, for example, producing more precise and more sharply contoured application than in the case of application of adhesive to substrates, especially porous substrates, such as paper, for example. The primer in this case may serve as an adhesion-promoting base with precisely adjustable surface properties for the adhesive applied. This also extends the spectrum of substrates to which foil application is possible. With the method and the apparatus, in particular, it is possible to process a multiplicity of substrates, such as, for example, various papers, plastics with respectively different surface properties, especially different roughnesses and/or absorbencies.

In one advantageous embodiment it is possible to enable foil application to a substrate in the form of a three-dimensional article, more particularly a cylindrical, oval, rectangular, or flat article, especially on rotary indexing machines or linear indexing machines, where foil application is only part of the operations performed on the substrate. In machines of this kind, for example, before and/or after foil application, there are also any of a wide variety of printing and/or coating procedures. During foil application, in particular, the substrate is held either in such a way as to be rotatable about an axis of rotation, or held in such a way as to be firmly fixed by a mounting means, and the transfer ply of the foil is subsequently pressed onto the substrate by a pressing means, with the adhesive being cured at the same time.

In this case it is preferred if the pressing means is transparent to UV radiation at least in subregions. This allows the pressing means to be disposed between a UV radiation source, which generates the UV radiation, and the holding means. The regions in which the pressing layer is transparent may be guided by the regions at which the holding means is transparent. Alternatively, the pressing layer may also be entirely transparent, whereas the holding means is transparent only in places.

The pressing means and/or the pressing layer is preferably transparent or translucent for UV radiation in the wavelength range from 250 nm to 420 nm, preferably in the range from 380 nm to 420 nm, more preferably 380 nm to 400 nm. The transparency or translucency here is to be, in particular, 30% to 100%, preferably 40% to 100%. The transparency or translucency is dependent on the thickness of the pressing layer. A lower transparency or translucency may be compensated by higher UV intensity.

The UV radiation source, for example, may be disposed within a cylinder of the pressing means. For this purpose the cylinder is configured at least in places as a hollow cylinder. The material of the cylinder here is selected such that the wavelengths of the UV radiation which are needed for the curing of the adhesive can be transmitted through the cylinder. The cylinder may be completely transparent for the UV radiation; alternatively, transparent windows may also be provided in the cylinder, so that UV radiation emerges from the cylinder only when the UV radiation is specifically needed for the curing of the adhesive.

In particular, the region of the substrate which is to be exposed using UV radiation may be adjusted so that, when the transfer foil is pressed onto the adhesive, the curing of the UV adhesive has advanced to an extent such that the transfer ply of the foil adheres to the substrate and can be parted from the carrier foil. Depending on the adhesive used and on the intensity of the UV radiation, it may for this purpose be necessary to expose the adhesive on the substrate even ahead of the contact line between substrate and foil. Adjusting the range to be exposed may be accomplished, for example, by (optionally adjustable or exchangeable) screens between UV radiation source and substrate. One or more screens may also be mounted directly on the pressing means. Adjustment may also be accomplished by adjusting the divergence of the UV radiation emitted by the UV radiation source.

In a further preferred embodiment of the method, the pressing apparatus additionally has a flexible pressing layer on the holding means. In this way it is possible to compensate irregularities in the three-dimensional substrate, the foil and/or the mechanical construction. The flexible pressing layer may consist of silicone, for example.

The pressing means and/or the pressing layer is preferably made of silicone and has a thickness, in the range through which UV radiation is to pass, in the range from 1 mm to 20 mm, preferably from 3 mm to 10 mm. The silicone preferably has a hardness of 20° Shore A to 70° Shore A, preferably 20° Shore A to 50° Shore A. The silicone may be a hot vulcanizate or cold vulcanizate, preferably a hot vulcanizate.

It is also possible to construct the pressing means and/or the pressing layer from a plurality of silicone layers. In that case the individual silicone layers may each have different hardnesses. For example, a first, inside layer may have a hardness of 10° Shore A to 50° Shore A, preferably 15° Shore A to 35° Shore A, and an outer layer may have a hardness of 20° Shore A to 70° Shore A, preferably of 20° Shore A to 50° Shore A.

The pressing means may be joined to the pressing layer, in particular, in a force-fitting and/or form-fitting manner. This allows a particularly durable join to be achieved.

The shape of the pressing layer may be flat or three-dimensionally shaped (three-dimensionally dished or bowed contour with a smooth or structured/textured surface). Flat pressing layers are suitable particularly for the application of the foil to cylindrical geometries, and three-dimensionally shaped pressing layers are suitable particularly for noncircular, oval, and angular geometries. A structured and/or textured surface to the pressing layer may also be advantageous for the purpose of transmitting this structure and/or texture to the surface of the substrate in a superimposing way when the transfer ply of the foil is transferred. The structure and/or texture here may be a continuous pattern or continuous motif or else an individual pattern and/or motif or a combination thereof.

In series of experiments, in particular, it has emerged that the surface of a silicone surface of the pressing layer may be adhesive for the foil to be processed. In that case the surface roughness (mean roughness value) of an adhesive surface of this kind is, from experience, below about 0.5 μm, more particularly between 0.06 μm and 0.5 μm, preferably between about 0.1 μm and 0.5 μm. With an adhesive surface of this kind it is advantageous if there is an interlayer made, in particular, of PET, between pressing layer and foil. The interlayer reduces the adhesiveness of the pressing layer and considerably facilitates the processing of the foil, since the foil no longer remains disruptively adhering on the surface of the pressing layer. The thickness of the interlayer increases the effective hardness of the silicone die compensating effect. A number of exemplary embodiments are given below:

5 mm pressing layer of silicone (49° Shore A) with 15 μm interlayer (PET foil) produces 73° Shore A (corresponding to 49% increase).

5 mm pressing layer of silicone (49° Shore A) with 50 μm interlayer (PET foil) produces 85° Shore A (corresponding to 70% increase).

10 mm pressing layer of silicone (47° Shore A) with 15 μm interlayer (PET foil) produces 71° Shore A (corresponding to 51% increase).

10 mm pressing layer of silicone (47° Shore A) with 50 μm interlayer (PET foil) produces 78° Shore A (corresponding to 59% increase).

With regard to these figures it should be noted that on the basis of the definition of the measurement conditions for the Shore A measurement method, it is not actually permissible any longer to measure the sandwich composed of pressing layer and interlayer. The Shore A measurement method measures a depth of penetration of a test body between 0 mm and 2.5 mm and prescribes a minimum specimen thickness of 6 mm. As a result of the interlayer in conjunction with the Shore A measurement method, therefore, the apparent hardness is greater than the hardness actually present. The measurement value cannot be used to draw conclusions about the actual/effective hardness. All that may be stated is that the effective hardness of the sandwich is greater than the hardness of the silicone die, and the foil dominates and defines the overall hardness of the sandwich, independently of the thickness of the silicone layer.

The pressing layer is preferably provided with a non-adhesive surface, and so it is possible to omit the use of an interlayer. In this case the overall arrangement is softer, and so a smaller pressing force is sufficient to press the substrate onto the pressing layer. The surface roughness (mean roughness value) of a non-adhesive surface of this kind, from experience, is above about 0.5 µm, more particularly between 0.5 µm and 5 µm, preferably between about 0.6 µm and 4 µm, more preferably between about 0.8 µm and 3 µm.

The pressing means or pressing layer ensures the reliable and homogeneous unrolling of the three-dimensional substrate under defined conditions, and at the same time evens out dimensional and movement-related tolerances. The pressing means or the pressing layer has only a slight pressing force in the case, for example, of a plastic substrate, since they are otherwise deformed; consequently, in the case of a substrate made from harder and/or more resistant materials such as glass, porcelain or ceramic, for example, higher dimensional tolerances and/or greater mechanical stability of the substrate mean that somewhat higher pressing forces are also advantageous. The pressing force is approximately 1 N to 1000 N. In the case of a plastic substrate, for example, the pressing force may be about 50 N to 200 N, and in the case of a substrate made of glass, porcelain or ceramic it may be about 75 N to 300 N. In order, additionally, to prevent deformation of plastics parts, the three-dimensional substrate to be decorated may for example be filled with compressed air during the embossing process, in a holding means designed accordingly.

The pre-curing of the radially curable adhesive further improves the quality of application. In particular, it raises the viscosity of the adhesive before the transfer ply is pressed onto the substrate in the roll arrangement. This prevents running or excessive squeezing of the applied adhesive pixels during transfer, and so a particularly sharp-contoured application of the transfer ply to the substrate is achieved, and a particularly high surface quality is achieved on the part of the layers transferred. Slight squeezing of the adhesive pixels here is entirely desirable, in order for directly adjacent adhesive pixels to approach one another and combine. This may be advantageous in order to prevent pixelation in the case of closed areas and/or at motif edges—in other words, to prevent individual pixels appearing disruptively from a visual standpoint. The squeezing must only be such that the desired resolution is not excessively reduced.

As compared with cationically curing adhesives, moreover, the use of radically curable adhesives affords the advantage of particularly rapid full curing, something actually enabled by the pre-curing of the adhesive prior to foil application. Furthermore, in the case of radical curing, in contrast to cationic systems, no acids form, and so there are no restrictions on the substrate that can be used, in terms of acid compatibility.

The adhesive is preferably applied using an inkjet printhead having a resolution of 300 to 1200 nozzles per inch (npi). This allows high-resolution application of the adhesive, allowing even fine foil structures to be transferred with sharp contouring. Generally speaking, the resolution of the printhead corresponds to the resolution of the droplets of adhesive on the transfer ply that is achieved, in dpi (dots per inch).

It is further preferred if the adhesive is applied using an inkjet printhead having a nozzle diameter of 15 µm to 25 µm with a tolerance of not more than ±5 µm, and/or with a nozzle spacing of 30 µm to 150 µm, or more particularly a nozzle spacing of 30 µm to 80 µm, with a tolerance of not more than ±5 µm.

The low nozzle spacing—particularly transversely to the direction of printing—ensures that the transferred droplets of adhesive are sufficiently close to one another on the transfer ply or even, possibly, overlap, thus achieving effective adhesion over the entire printed area.

It is further preferred if the adhesive is applied with a weight per unit area of 0.5 g/m$^2$ to 20 g/m$^2$ and/or with a layer thickness of 0.5 µm to 20 µm, preferably of 1 µm to 15 µm, to the at least one subregion. Within this range, which guarantees effective adhesion, the application rate or layer thickness of the adhesive may be varied as a function of the substrate used, particularly as a function of its absorbency, in order further to optimize the application outcome.

It is useful here if the inkjet printhead provides droplets of adhesive with a frequency of 6 kHz to 110 kHz. At customary conveying rates of 10 m/min to 30 m/min for the foil to be printed, the desired resolution of 360 dpi to 1200 dpi can be achieved in this way in the conveying direction.

The inkjet printhead preferably provides droplets of adhesive with a volume of 2 pl to 50 pl, with a tolerance of not more than ±6%. Accordingly, with the resolutions and speeds of application described, the necessary quantity of adhesive is applied uniformly to the transfer ply.

It is preferred here if the inkjet printhead provides droplets of adhesive with a flight velocity of 5 m/s to 10 m/s, with a tolerance of not more than ±15%. By this means, the deflection of the droplets of adhesive, particularly by air draft during transfer from the printhead to the transfer ply, is minimized, and so the droplets of adhesive land in the desired defined disposition on the transfer ply.

It is useful, moreover, if the adhesive is applied with an application temperature of 40° C. to 45° C. and/or with a viscosity of 5 mPas to 20 mPas, preferably of 7 mPas to 15 mPas, to the transfer ply. Temperature monitoring of the printhead here ensures that the adhesive possesses the desired viscosity. The viscosity is a determinant in turn of the pixel size and pixel shape of the adhesive applied to the transfer ply; at the values stated, optimum printability of the adhesive is ensured.

As soon as the adhesive leaves the printhead and comes into contact with ambient air and/or with the transfer ply, cooling takes place, and raises the viscosity of the adhesive. This counteracts the running or spreading of the droplets of adhesive transferred.

It is further advantageous if a distance between inkjet printhead and substrate during application of the adhesive does not exceed 1 mm.

This as well reduces the effect of air draft on the adhesive.

A relative velocity between inkjet printhead and transfer ply during application of the adhesive is preferably 10 m/min to 100 m/min, more particularly about 10 m/min to 75 m/min.

With these velocities, particularly in combination with the parameters specified above, the desired resolution of the adhesive printed onto the transfer ply is achieved.

It is preferred here to use an adhesive of the following composition (percent figures denote volume-percent):

| | |
|---|---|
| 2-phenoxyethyl acrylate | 10% to 60%, preferably 25% to 50%; |
| 4-(1-oxo-2-propenyl)morpholine | 5% to 40%, preferably 10% to 25%; |
| exo-1,7,7-trimethylbicyclo[2.2.1]hept-2-yl acrylate | 10% to 40%, preferably 20% to 25%; |

-continued

| | |
|---|---|
| 2,4,6-trimethylbenzoyldiphenyl phosphine oxide | 5% to 35%, preferably 10% to 25%; |
| dipropylene glycol diacrylate | 1% to 20%, preferably 3% to 10%; |
| urethane acrylate oligomer | 1% to 20%, preferably 1% to 10%; |
| carbon black pigment | 0.01% to 10%, preferably 0.1 to 0.5%. |

A formulation of this kind furnishes the desired properties, especially the rapid full curing and a viscosity which permits effective printability in conjunction with stable and sharp application.

It is useful here if an adhesive having a density of 1 g/ml to 1.5 g/ml, preferably of 1.0 g/ml to 1.1 g/ml, is used.

The pre-curing of the adhesive preferably takes place at 0.02 s to 0.025 s after the application of the adhesive. This pre-curing fixes the adhesive on the transfer ply very rapidly after printing, so that running or spreading of the droplets of adhesive is largely avoided and the high print resolution is retained as effectively as possible.

It is useful here if the pre-curing of the adhesive takes place with UV light at least 90% of whose energy is emitted in the wavelength range between 380 nm and 420 nm. At these wavelengths, particularly with the adhesive formulations outlined above, the radical curing is reliably initiated.

It is further advantageous if the pre-curing of the adhesive takes place with a gross irradiation power of 2 W/cm$^2$ to 5 W/cm$^2$ and/or with a net irradiation power of 0.7 W/cm$^2$ to 2 W/cm$^2$ and/or with an energy input into the adhesive of 8 mJ/cm$^2$ to 112 mJ/cm$^2$. This ensures that the adhesive achieves the desired increase in viscosity, but is not fully cured, so that the necessary adhesive effect of the adhesive is retained on application of the transfer ply to the substrate.

The pre-curing of the adhesive preferably takes place with an exposure time of 0.02 s to 0.056 s. At the aforementioned transport velocities of the substrate and at the stated irradiation powers, the necessary energy input for pre-curing is ensured in this way.

It is useful here if the pre-curing of the adhesive is accompanied by an increase in its viscosity to 50 mPas to 200 mPas. A viscosity increase of this kind guarantees that the droplets of adhesive will not be squeezed during application of the transfer ply to the substrate, allowing the transfer ply to be transferred to the substrate with substantially the same resolution as that achieved during printing of the adhesive.

Application of the at least one subregion of the transfer ply provided with adhesive to the substrate takes place preferably between a press roll and an impression roll.

This achieves a linear pressing which is constant over the entire width of the substrate, and hence a uniform, high-quality application of the transfer ply.

It is useful here if the application of the at least one subregion of the transfer ply provided with adhesive to the substrate takes place with an applied pressure of 10 N to 80 N. The applied pressure can be varied within this range in order to adapt the method to the nature of the substrate, and to prevent damage or deformation of the substrate.

Application of the at least one subregion of the transfer ply provided with adhesive to the substrate takes place advantageously 0.2 s to 1.7 s after the pre-curing of the adhesive. The pre-curing reaction is able to progress within this period, without excessive hardening of the adhesive, which could adversely affect the adhesion.

It is preferred, moreover, if the substrate, before the application of the at least one subregion of the transfer ply provided with adhesive, is pretreated, in particular by a corona treatment, a plasma treatment, by flaming or by coating with a varnish layer, more particularly a colored varnish layer and/or a primer layer. It is possible by this means to improve the adhesion of adhesive even for substrates which have intrinsically poor adhesiveness, allowing reliable and sharply contoured application of the transfer ply even to substrates of this kind.

The full curing of the adhesive at 0.2 s to 1.7 s takes place preferably after the application of the transfer ply to the substrate. With the customary transport velocities of substrate and foil, this ensures a sufficient physical distance between the roll arrangement and the full-cure station.

It is useful here if the full curing of the adhesive takes place with UV light at least 90% of whose energy is emitted in the wavelength range between 380 nm and 420 nm. At these wavelengths, particularly with the adhesive formulations outlined above, the radical curing is reliably initiated.

It is preferred, furthermore, if the full curing of the adhesive takes place with a gross irradiation power of 12 W/cm$^2$ to 20 W/cm$^2$ and/or with a net irradiation power of 4.8 W/cm$^2$ to 8 W/cm$^2$ and/or with an energy input into the adhesive of 200 mJ/cm$^2$ to 900 mJ/cm$^2$, preferably of 200 mJ/cm$^2$ to 400 mJ/cm$^2$. With an energy input of this kind, reliable through-curing of the adhesive is achieved, and so, after the full-curing step, the carrier ply of the foil can be removed without damage to the applied transfer ply.

It is advantageous, furthermore, if the full curing of the adhesive takes place with an exposure time of 0.04 s to 0.112 s. At the stated gross irradiation powers and with the customary transport velocities, the necessary net energy input for the through-curing of the adhesive is ensured in this way.

It is further preferred if the detachment of the carrier ply takes place at 0.2 s to 1.7 s after the full curing of the adhesive. In this way, with the customary transport velocities of substrate and foil, a sufficient physical distance is ensured between the full-cure station and the detachment station.

Alternatively or additionally to the use of the UV-curable adhesive described, provision may be made for a thermoplastic toner to be applied as adhesion promoter to at least one subregion of the substrate and/or of the transfer ply. For the application of the foil, after the application of the foil to the substrate, pressure and heat are introduced onto the foil and/or onto the substrate into this layer assembly in such a way that the thermoplastic toner melts and the transfer ply of the foil joins to the substrate.

This joining, similarly to the application by means of UV-curable adhesive, takes place likewise preferably in a roll arrangement composed of at least two interacting rolls which form a press nip. The roll arrangement consists preferably of at least one press roll and at least one impression roll. The foil and the substrate are passed through the press nip. Here, at least one of the rolls may be directly or indirectly heated, in order to provide the corresponding heat. The applied pressure in the press nip is able to provide the requisite pressing pressure.

After the foil and the substrate have left the press nip, the layer assembly cools down and the toner hardens again. The carrier ply of the foil can now be removed from the foil transfer ply transferred to the substrate at least in the subregion.

The roll arrangement for the application of the foil with UV-curable adhesive to the substrate and the roll arrangement for application of the foil with thermoplastic toner may be identical or else different.

The press roll may have a coating of an elastomer with a thickness in the range from 3 mm to 10 mm, preferably in the range from 5 mm to 10 mm. When a pressing pressure is developed, the surface of the coating is deformed in such a way that a two-dimensional press nip is developed, rather than a linear press nip. The press nip may have a width, for example, of 5 mm to 20 mm. It has been found appropriate to set a press nip having a width of 5 mm to 10 mm. The associated pressing pressure may be, for example, in the range from 1 bar to 6 bar. It has been found appropriate to select the pressing pressure in the range from 3 bar to 6 bar.

The elastomer may preferably be silicone rubber or a plastic.

Provision may be made for the coating to have a degree of hardness in the range from 60° Shore A to 95° Shore A, preferably in the range from 70° Shore A to 90° Shore A.

In a further embodiment, provision may be made for the support element to take the form of the end face of a sonotrode of an ultrasound bearing means. The ultrasound bearing means comprises the sonotrode and an ultrasonic transducer. Between the sonotrode and the underside of the impressed substrate, the ultrasound exposure forms a film of air on which the impressed substrate glides. In the bearing gap which is made as a result, a pressure is built up between the end face of the sonotrode and the underside of the impressed substrate, and this pressure, like the thickness of the film of air, can be precisely adjusted. It is also possible to design the end face of the sonotrode with suction apertures which are connected, via channels, to a vacuum pump, in order to suck the substrate against the pressure in the bearing gap and so to render the bearing gap even more exactly adjustable by the equilibrium pressure that is established.

The press roll may be heated using a heating means disposed outside the press roll. With preference it is possible to provide an infrared radiation heating means with temperature regulator. The pressing temperature may be in the range from 100° C. to 250° C., preferably in the range from 130° C. to 190° C. It is also possible to provide a heating means disposed within the press roll. A heating means of this kind within the press roll may be, for example, an electrical heating element, more particularly a heating spiral or heating coil. Within the press roll it is also possible to dispose a temperature-conditioned oil circuit, which heats the press roll to a desired temperature.

The width of the press nip is determined essentially by the pressing pressure and by the local deformation of the press roll coating that takes place under the pressing pressure. The press nip has a width of 5 mm to 20 mm, preferably a width of 5 mm to 10 mm. A pressing pressure of 1 bar to 6 bar is generated within the press nip, preferably a pressing pressure of 3 bar to 6 bar. The pressing temperature may be in the range from 100° C. to 250° C., preferably in the range from 130° C. to 190° C. The transfer ply is transferred to the substrate with a velocity of up to 75 m/min. The values to be set for pressure, temperature, and velocity are dependent on numerous parameters, such as the physical properties of the foil material employed, the decoration on the transfer ply, and the physical properties of the substrate material. On account of the diverse determining factors, mathematical modeling is so complex that the values referred to above are determined preferably by experiments, starting from a basic setting of the apparatus.

In one example case, for example, the following processing parameters were set:

| | |
|---|---|
| Temperature of the surface of the press roll: | 150 to 155° C. |
| Temperature regulation setting: | 160° C. |
| Embossing pressure: | 4 bar |
| Advance velocity: | 15 m/min |
| Foil: | KURZ Digital Metal DT-H Silver |
| Toner: | HP Indigo ElectroInk black |
| Substrate material: | Digital Silver Bilderdruck Material 200 g/m² |
| Sheet size: | 500 mm × 320 mm |

If the same roll arrangement is used for both variants, the heating element can be deactivated when foil is applied with the UV-curable adhesive. Similarly, the UV light sources for the curing of the adhesive may be deactivated if foil is applied using thermoplastic toner.

An alternative possibility is to use different roll arrangements for the application of foil to the substrate by means of UV-curable adhesive, on the one hand, and for the application of foil to the substrate by means of thermoplastic toner, on the other. For this purpose, both roll arrangements may be arranged one after the other, for example, in the conveying direction of the substrate and of the foil, in such a way that different conveying paths are selected, at least for the foil, depending on the choice of application variant. In this way, the foil can be supplied to the respective roll arrangement, and application carried out by the respective roll arrangement.

The application of the foil by means of UV-curable adhesive or by thermoplastic toner to a substrate may take place alternatively to one another or, so to speak, simultaneously in two successive operating steps.

In the case of an alternative use, for example, the foil to be applied may be selected for the particular application and supplied accordingly. On switching to the alternative mode of application, the foil may correspondingly be changed over and resupplied.

In the case of a so-to-speak simultaneous use, two roll arrangements described above may be disposed sequentially one after the other in the running direction of the substrate, and two different foils may be applied by the two different modes of application to a common substrate or else to different substrates.

It is preferred in this case if the application by means of thermoplastic toner takes place first, with pressure and heat acting on the foil and on the substrate. In a subsequent operating step, the foil may be applied with UV-curable adhesive, in which case, in particular, heat exposure of the foil possibly already applied on the substrate is not repeated. By this means, the substrate and, in particular, the foil are protected from damage and/or redetachment.

Preference is given to using a foil which has a carrier ply of polyester, polyolefin, polyvinyl, polyimide, ABS, PET, PC, PP, PE, PVC or PS with a layer thickness of 5 μm to 50 μm, preferably of 7 μm to 23 μm. The carrier ply protects and stabilizes the transfer ply during the production, storage, and processing of the foil. If UV light exposure is to take place from the side of the carrier ply during pre-curing or through-curing of the adhesive, the material should be selected according to the corresponding transparency of the carrier ply in the exposure wavelength range.

It is useful, moreover, if a foil is used whose transfer ply has a detachment layer of acrylate copolymer, in particular of an aqueous polyurethane copolymer, and preferably free from wax and/or free from silicone, with a layer thickness of 0.01 μm to 2 μm, preferably of 0.1 μm to 0.5 μm, which is disposed on a surface of the carrier ply. The detachment layer permits simple and damage-free detachment of the carrier ply from the transfer ply following application thereof to the substrate.

It is preferred, moreover, if a foil is used whose transfer ply has a varnish layer of nitrocellulose, polyacrylate, and polyurethane copolymer with a layer thickness of 0.1 µm to 5 µm, preferably of 1 µm to 2 µm, which is disposed on a detachment layer surface facing away from the carrier ply. The varnish layer in this case may be transparent, translucent or transparently colored, translucently colored or opaquely colored.

Used with preference, furthermore, is a foil whose transfer ply has a metal layer of aluminum and/or chromium and/or silver and/or gold and/or copper with a layer thickness of 10 nm to 200 nm, preferably of 10 nm to 50 nm, which is disposed on a varnish layer surface facing away from the carrier ply.

Alternatively or additionally to the metal layer, there may also be a layer of an HRI (HRI=High Refractive Index) material provided. Examples of HRI materials are metal oxides such as ZnS, $TiO_x$ or else varnishes with corresponding nanoparticles.

Not only the varnish layer but also the metal layer generate the desired decorative effect of the transfer ply after it has been transferred to the substrate. Particularly appealing designs can be realized through the combination of different varnish colors and metals.

There is particular advantage in using a foil whose transfer ply has a primer layer of polyacrylates and/or vinyl acetate copolymers with a layer thickness of 0.1 µm to 1.5 µm, preferably of 0.5 µm to 0.8 µm, which forms a transfer ply surface facing away from the carrier ply. This primer layer may be optimized in terms of its physical and chemical properties with respect to the adhesive used, thus ensuring optimum adhesion between substrate and transfer ply very largely independently of the substrate. Furthermore, a primer layer optimized in this way guarantees that the applied adhesive remains in the desired resolution largely without running, spreading or squeezing on the transfer ply.

It is especially useful here if the primer layer is microporous and in particular has a surface roughness in the range from 100 nm to 180 nm, more particularly in the range from 120 nm to 160 nm. The adhesive is able to penetrate partially into such a layer, and is thereby fixed in high resolution to particularly good effect.

It has proven particularly favorable to employ a primer layer having a pigmentation number of 1.5 $cm^3$/g to 120 $cm^3$/g, particularly the range from 10 $cm^3$/g to 20 $cm^3$/g.

Specified below is the composition of a primer layer for the purpose of calculation (figures in grams):

---
4900 organic solvent ethyl alcohol
150 organic solvent toluene
2400 organic solvent acetone
600 organic solvent mineral spirit 80/110
150 water
120 binder I: ethyl methacrylate polymer
250 binder II: vinyl acetate homopolymer
500 binder III: vinyl acetate-vinyl laurate copolymer, FK = 50 +/− 1%
400 binder IV: isobutyl methacrylate
20 pigment polyfunctional silicon oxide, average particle size 3 µm
5 filler micronized amide wax, particle size 3 µm to 8 µm
---

The following relationship applies to the pigmentation number of this adhesive layer:

$$PN = \sum_{1}^{x} \frac{(m_p \times f)_x}{(m_{BM} + m_A)} = \frac{20 \text{ g} \times 750}{1020 \text{ g} + 0 \text{ g}} = 14.7 \text{ cm}^3/\text{g}$$

where:
mp=20 g polyfunctional silicon oxide
f=ON/d=300/0.4 g/$cm^3$=750 $cm^3$/g for polyfunctional silicon oxide
$m_{BM}$=120 g binder I+250 g binder II+(0.5×500 g) binder III+400 g binder
IV=1020 g
$m_A$=0 g In this way, starting from a primer layer composition found to be good, it is possible to calculate further possible pigmentations, deviating from this system, in a rapid and uncomplicated way.

It is useful, furthermore, if the primer layer has a surface tension of 38 mN/m to 46 mN/m, preferably of 41 mN/m to 43 mN/m. Surface tensions of this kind allow droplets of adhesive, more particularly from adhesive systems as described above, with a defined geometry to adhere on the surface without running.

It has proven particularly favorable, when using a thermoplastic toner, to employ a primer layer having a pigmentation number of 0.5 $cm^3$/g to 120 $cm^3$/g, especially the range from 1 $cm^3$/g to 10 $cm^3$/g.

Specified below is the composition of a primer layer for this use, for the purpose of calculation (figures in grams):

---
340 organic solvent ethyl alcohol
3700 organic solvent toluene
1500 organic solvent acetone
225 binder I: chlorinated polypropylene
125 binder II: poly-n-butyl-methyl methacrylate
35 binder III: n-butyl-methyl-methyl methacrylate copolymer
148 pigment polyfunctional silicon oxide, average particle size 12 nm
---

The following applies to the pigmentation number for this primer layer:

$$PN = \sum_{1}^{x} \frac{(m_p \times f)_x}{(m_{BM} + m_A)} = \frac{148 \text{ g} \times 4.4}{385 \text{ g} + 0 \text{ g}} = 1.69 \text{ cm}^3/\text{g}$$

where:
mp=148 g of polyfunctional silicon oxide
f=ON/d=220/50 g/$cm^3$=4.4 $cm^3$/g for polyfunctional silicon oxide
$m_{BM}$=225 g binder I+125 g binder II+35 g binder III=385 g
$m_A$=0 g.

With preference the melting range of the primer layer is in the range from 60° C. to 130° C., preferably in the 80° C. to 115° C. range.

In this way, starting from a primer layer composition found to be good, it is possible to compute further possible pigmentations deviating from this composition, in a rapid and uncomplicated way.

Preferably, moreover, before and/or after the application of the transfer ply, a print layer is applied in particular by means of a further inkjet printhead and/or by means of a further xerographic printing apparatus to the substrate and/or to the transfer ply. In this way it is possible to provide additional designs which overlap or are overlapped by the transfer ply.

It is useful, furthermore, if the first UV light source is an LED light source. With LED light sources it is possible to provide virtually monochromatic light, thereby ensuring that the required radiation intensity is available within the wavelength range needed for the curing of the adhesive. This can generally not be achieved with conventional medium-pressure mercury vapor lamps.

It is preferred, moreover, if the first UV light source in the conveying direction of the foil has a window width of 10 mm to 30 mm. This allows the applied adhesive to be irradiated two-dimensionally.

The first UV light source in the conveying direction of the foil is usefully disposed 1 cm to 4 cm downstream of the inkjet printhead. At the customary transport velocities of the foil, it is possible in this way to maintain the aforementioned time between application of adhesive and pre-curing.

The impression roll or the counterbearing is preferably formed of a material having a degree of hardness in the range from 60° Shore A to 95° Shore A, preferably in the range from 80° Shore A to 95° Shore A, and/or having a degree of hardness in the range from 450 HV 10 (HV=Vickers hardness) to 520 HV 10, preferably in the range from 465 HV 10 to 500 HV 10. This material is, for example, plastic or silicone, or else a metal such as aluminum or steel.

The physical parameters and the specific geometry of the roll arrangement may be adapted within the specified ranges, in dependence on the properties of the substrate to be processed and of the foil to be processed, in order on the one hand to ensure optimum adhesion between transfer ply and substrate, and on the other hand to prevent the adhesive being squeezed out and/or the transfer ply or the substrate being damaged.

The roll arrangement here is preferably disposed at a distance of 10 cm to 30 cm from the first UV light source.

With the customary transport velocities of foil and substrate, this ensures the preliminary drying time, already elucidated above, between exposure of the adhesive and application of the foil.

It is preferred, further, if the second UV light source is an LED light source. With LED light sources it is possible to provide virtually monochromatic light, thereby ensuring that the required radiation intensity is available in the wavelength range required for the curing of the adhesive. This can generally not be achieved, or is achievable only with significantly greater energy expenditure, with conventional medium-pressure mercury vapor lamps.

Advantageously here, the second UV light source in the conveying direction of the foil has a window width of 10 mm to 40 mm. This ensures two-dimensional irradiation of the adhesive.

The second UV light source in the conveying direction of the foil is preferably disposed 10 cm to 30 cm downstream of the roll arrangement. This ensures a sufficient physical distance between the roll arrangement and the full-cure station.

It is useful, moreover, if the peeling unit has a roll having a diameter of 0.5 cm to 2 cm over which the carrier ply can be peeled off.

The peeling unit in the conveying direction of the foil is preferably disposed 10 cm to 30 cm downstream of the second UV light source.

With the customary transport velocities of foil and substrate, the drying time already elucidated above between application of the foil and detachment of the carrier ply is ensured in this way, allowing the carrier ply to be parted without damage.

It is preferred, moreover, if the printing apparatus has a support surface for the fixing of a substrate in sheet form. In this embodiment, then, the printing apparatus is a large-format flatbed printer. Alternatively, the support area may be designed for a substrate in strip form, to provide a roll-to-roll-operating printing machine as the printing apparatus.

In that case it is advantageous if the inkjet printhead and/or the application apparatus are disposed on a respective carriage which is movable in two orthogonal directions relative to the substrate to be printed. In this way, all positions of the sheet-like substrate can be reached by inkjet printhead and the application apparatus without the substrate itself having to be moved.

As an alternative to this, the printing apparatus may have a conveying apparatus for the relative moving of a substrate in sheet form or of a continuous substrate relative to the inkjet printhead and the application apparatus.

It is useful in this case if the inkjet printhead and/or the application apparatus are disposed on a respective carriage which is movable orthogonally to a conveying direction of the substrate to be printed. This embodiment permits a mechanically more simple construction of the guiding of inkjet printhead and application apparatus, since a degree of freedom of motion is provided by the movement of the substrate.

It is useful here if the conveying apparatus is designed as a steel belt circulating around two rolls. A steel belt of this kind possesses the necessary strength to be able to act as a counterpressure plate during application of the foil.

BRIEF DESCRIPTION OF THE DRAWINGS

The invention is now elucidated in more detail using exemplary embodiments. In the figures.

DETAILED DESCRIPTION OF THE PREFERRED EMBODIMENTS

Figure 1:
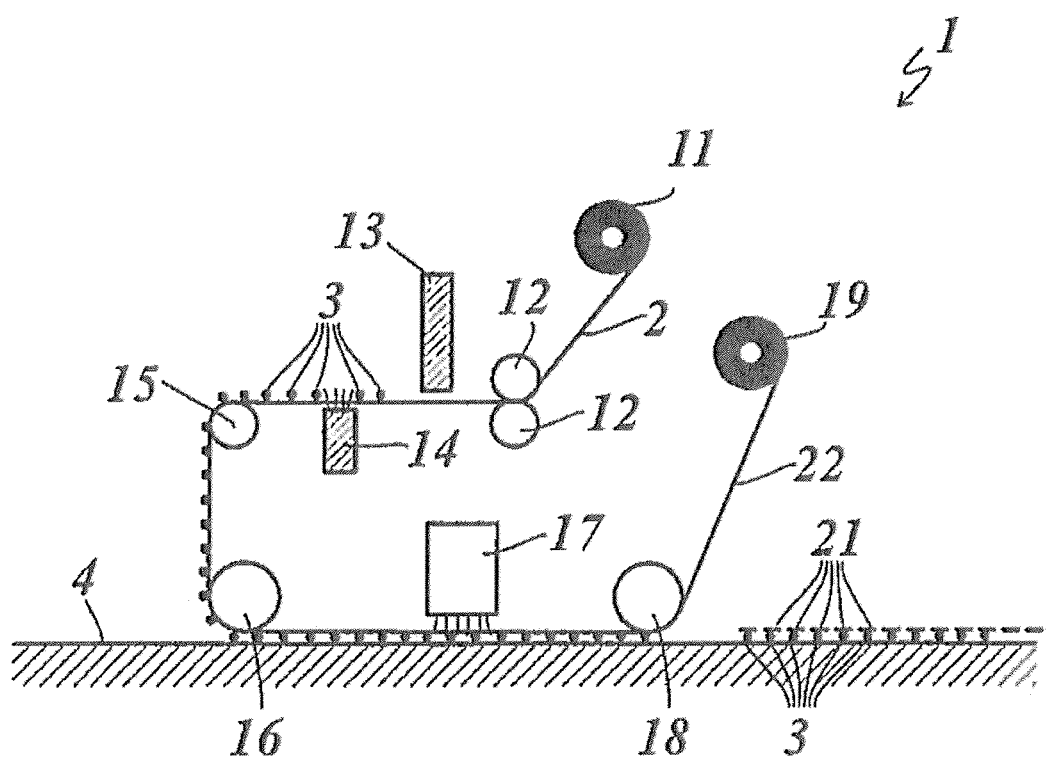
FIG. 1 shows a schematic representation of an exemplary embodiment of an application apparatus for applying a transfer ply of a foil to a substrate.

An application apparatus 1 for applying a transfer ply 21 of a foil 2 to a substrate 4 comprises a supply roller 11, on which the foil 2 is provided.

By way of guide rollers 12, the foil 2 is supplied to an inkjet printhead 13, by means of which droplets 3 of adhesive are applied to the transfer ply 21.

The droplets 3 of adhesive are then pre-cured by means of a first UV light source 14. The foil 2 is then supplied via a deflection roller 15 to a press roll 16, by means of which the adhesive-coated side of the transfer ply 21 is pressed onto a substrate 4. The opposing pressure here may be provided by an impression roll or else by a flat, solid base, something not explicitly shown here.

Following the application of the foil 2 to the substrate 4, foil 2 and substrate 4 are supplied to a second UV light source 17, which carries out full curing of the adhesive.

By way of a further roll 18 and/or of a detachment edge, not shown in any more detail here, lastly, a carrier ply 22 of the foil 2 is peeled off and wound up on a roller 19. Where the substrate 4 has been provided with the droplets 3 of adhesive, the transfer ply 21 remains on the substrate 4. The aforementioned detachment edge may be implemented by designing a bar-shaped hollow body on which an inlet for a compressed gas is arranged, and by designing at least one long edge of the detachment element in the form of a perforated detachment edge having outflow openings for the pressurized gas, in order to form a gas cushion between the carrier ply and the detachment edge. The angle of detachment in this case is dependent on the diameter of the roll 18 or, in the case of the detachment edge, on the orientation of the detachment edge.

By means of the application apparatus 1, therefore, an adhesive 3 is transferred by inkjet printing to a primer layer of the foil 2 and pre-cured, and is then pressed under pressure by the press roll 16 onto the substrate 4. The foil 2 with the adhesive 3 then bears against the substrate.

In the next step, the adhesive 3 between foil 2 and substrate 4 is through-cured by strong UV light. The adhesive 3 hardens under UV light. After curing has taken place, the carrier ply 22 can be peeled from the substrate 4. In this way the transfer ply 21 has been applied to the substrate.

Figure 8:
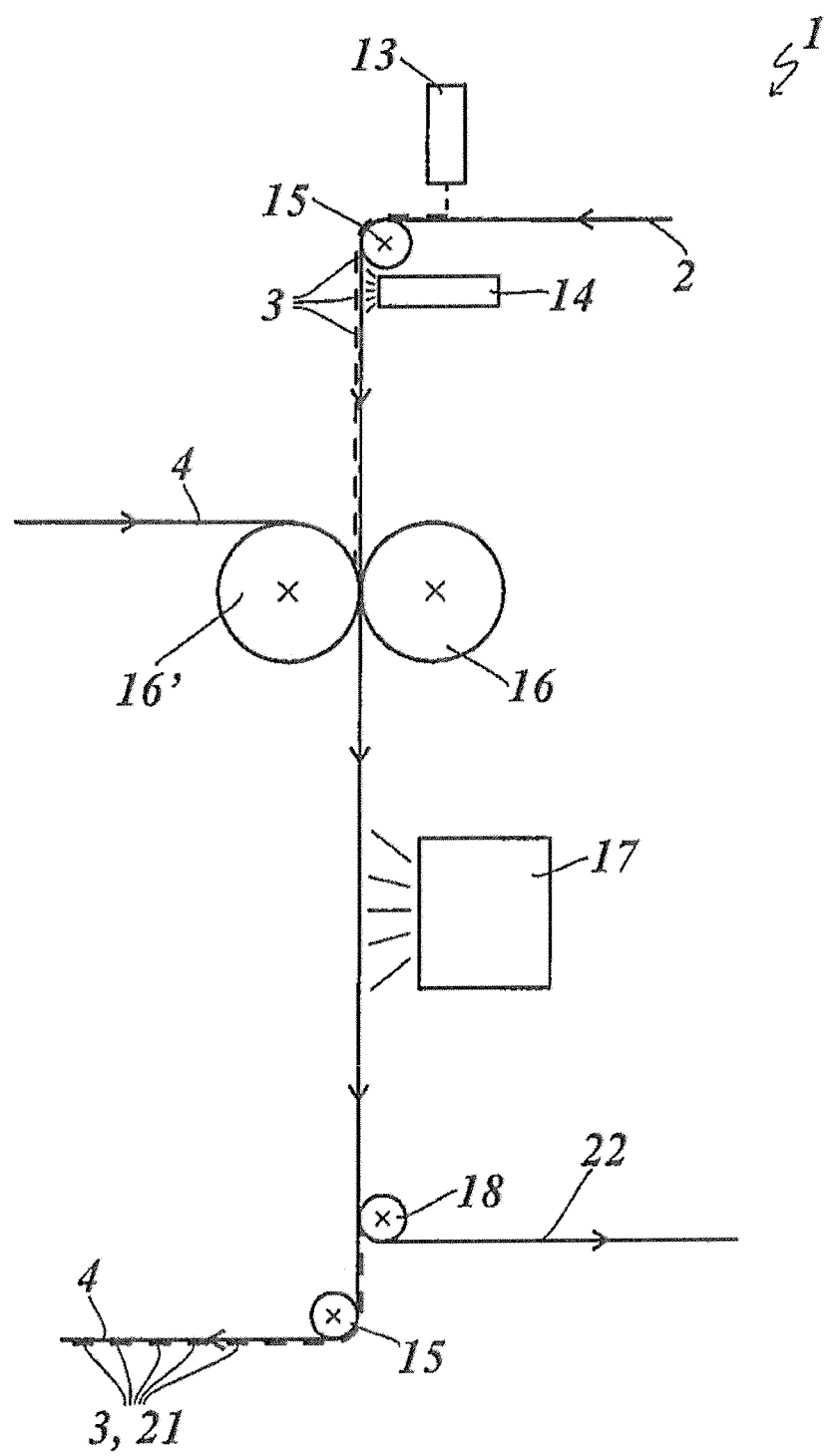
FIG. 8 shows a schematic representation of an alternative exemplary embodiment of an application apparatus for applying a transfer ply of a foil to a substrate.

An alternative exemplary embodiment of an application apparatus 1 is shown in FIG. 8. Here, the opposing pressure for the press roll 16 is provided not by a flat base, but instead by an impression roll 16'.

The foil 2 is first conveyed past the inkjet printhead 13 and, as described, is coated with adhesive 3. After the foil web has been diverted over a deflection roller 15, the adhesive 3 undergoes pre-curing by the first UV light source 14.

The foil 2 with the pre-cured adhesive is now guided between the press roll 16 and the impression roll 16', where it is brought together with the substrate and applied thereto in the manner described.

Subsequently, in analogy to FIG. 1, full curing takes place by the second UV light source 17, and the carrier ply is detached by way of the roll 18. The coated substrate 4 is taken off via a further deflection roller 15, and can be further-processed directly or stored on a roller (not shown).

The foil consists preferably of at least five layers: carrier ply 22, detachment layer 23, varnish layer 24, metal layer 25, and primer 26 (tie layer).

Figure 7:
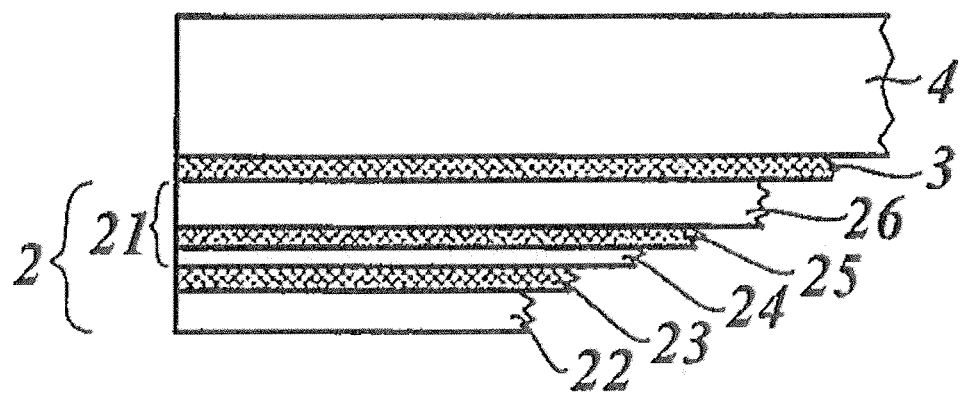
FIG. 7 shows a schematic sectional representation through an exemplary embodiment of a foil following application thereof to a substrate.

A schematic cross-sectional representation of the foil 2 following application thereof to the substrate 4, but before detachment of the carrier ply, is shown in FIG. 7.

The carrier ply 22 consists preferably of polyester, polyolefin, polyvinyl, polyimide, ABS, PET, PC, PP, PE, PVC or PS with a layer thickness of 5 μm to 50 μm, preferably of 7 μm to 23 μm. The carrier ply 22 protects and stabilizes the transfer ply 21 during production, storage, and processing of the foil. If exposure of UV light is to take place from the side of the carrier ply 22 during the pre-curing or through-curing of the adhesive, then the selection of material is guided by the corresponding transparency of the carrier ply in the exposure wavelength range.

The detachment layer 23 is preferably made of acrylate copolymer, more particularly of an aqueous polyurethane copolymer, and is preferably free of wax and/or free of silicone, having a layer thickness of 0.01 μm to 2 μm, preferably of 0.1 μm to 0.5 μm, and is disposed on a surface of the carrier ply 22.

The detachment layer 23 permits simple and damage-free detachment of the carrier ply 22 from the transfer ply 21 after the application thereof to the substrate.

The varnish layer 24 consists preferably of nitrocellulose, polyacrylate, and polyurethane copolymer, with a layer thickness of 0.1 μm to 5 μm, preferably of 1 μm to 2 μm, and is disposed on a detachment layer 23 surface facing away from the carrier ply 22.

The metal layer 25 is preferably made of aluminum and/or chromium and/or silver and/or gold and/or copper, with a layer thickness of 10 nm to 200 nm, preferably of 10 nm to 50 nm, and is disposed on a varnish layer 24 surface facing away from the carrier ply 22.

Not only the varnish layer 24 but also the metal layer 25 generate the desired decorative effect of the transfer ply 21 following transfer thereof to the substrate 4. Through the combination of different varnish colors and metals it is possible to realize particularly appealing designs.

The primer layer 26 is preferably made of polyacrylates and/or vinyl acetate copolymers with a layer thickness of 0.1 μm to 1.5 μm, preferably of 0.5 μm to 0.8 μm, and forms a transfer ply 21 surface facing away from the carrier ply 22.

By inkjet printing onto the primer layer 26 of the foil 2, running of the adhesive is largely reduced. In comparison to substrate surfaces, the primer layer 26 of the foil 2 is slightly microporous or rough, thus ensuring sharper and defined adhesive pixels on the foil and, later, on the substrate.

The surface properties of the foil 2, especially its microporosity or its surface roughness, or else the surface energy, can be adjusted in a defined way through the appropriate choice of the primer layer 26 and/or the composition thereof and/or mode of application. This is not readily possible on the substrate 4, since the substrate 4 and hence its specific properties are in practice mandated and cannot be further modified.

In order to achieve further increase in the application quality, the gloss of the applied transfer ply 21 of the foil 2, and the adhesion, partial curing of the adhesive 3 is carried out after the adhesive 3 has been printed onto the primer layer, and before the foil 2 has been pressed against the substrate 4 by the press roll 16.

The resulting change in viscosity of the adhesive 3 on the primer layer affords not only the advantages just stated but also an increase in the size of the substrate spectrum that can be used. The change in viscosity results in the formation of a "tough" layer of adhesive on the primer layer, to which the metallized varnish layer of the transfer ply 21 adheres like a mirror following application and through-curing. Especially on rough natural papers as substrate 4, this affords an improvement in foil application. For all other substrates 4 as well, the quality and the durability of foil application are increased.

The inkjet printhead 13 is designed preferably as a piezoelectric drop-on-demand printhead. For high-quality results, the printhead 13 must possess a particular physical resolution, droplet size, and nozzle spacing.

These nozzles may be disposed in one or more rows. The physical resolution ought to be 300 npi to 1200 npi (nozzles per inch). A small nozzle spacing transverse to the printing direction ensures that the printed pixels likewise are close to one another transverse to the printing direction, or overlap, depending on quantity of adhesive. Generally speaking, the npi correspond to the dpi (dots per inch) on the printed foil.

The nozzle spacing ought preferably to be 50 µm to 150 µm, for a preferred nozzle diameter of 15 µm to 25 µm, in each case with a tolerance of ±5 µm, so as to produce consistent results.

When using the grey-stage technology, a plurality of grey stages can be generated on the same pixel. The grey stages are generally produced by firing off a plurality of droplets of equal size onto a printed pixel. The behavior of the quantity of adhesive on the foil 2 is analogous to that of the grey stages when applying printing inks.

The quantity of adhesive here must be varied according to the absorbency of the primer layer. The quantity of adhesive on the foil ought preferably to be 1.2 g/m$^2$ to 12.6 g/m$^2$, in order to ensure complete foil application to every substrate 4. The layer thicknesses of the applied adhesive are in that case 1.205 µm to 12.655 µm.

For optimum wetting of the primer layer of the foil 2 with adhesive 3, this layer ought to have a surface tension of 38 mN/m to 46 mN/m, with the range from 41 mN/m to 43 mN/m in particular ensuring optimum ink acceptance.

In order to ensure high resolution in the printing direction, the piezoelectric actuator of the inkjet printhead 13 must fire off the droplets 3 of adhesive with a frequency of 6 kHz to 110 kHz, thus producing a resolution on the foil 2 of 360 dpi to 1200 dpi for print-medium velocities (that is, conveying velocities of foil 2 and substrate 4) of 10 m/min to 30 m/min.

The pressure within the nozzle chamber of the inkjet printhead at the time of droplet delivery is preferably 1 bar to 1.5 bar and must not be exceeded, in order not to damage the piezoelectric actuator. For the remainder of the time, there is a slight underpressure of around −5 to −25 mbar prevailing at the nozzle openings, in order to prevent unwanted emergence of ink.

The distance between the nozzle plate of the inkjet printhead 13 and the foil 2 must not exceed 1 mm, in order to minimize the deflection of the fine droplets 3 of adhesive by air draft.

The droplet volume ought preferably to be 2 pl to 50 pl; the tolerance is ±6% of the droplet volume. In this way, for a given resolution, the necessary, and a uniform, quantity of adhesive is achieved on the foil 2.

The droplet velocity in flight ought preferably to be 5 m/s to 10 m/s±15%, so that all of the droplets 3 of adhesive land very precisely alongside one another on the foil 2. If the droplet velocity of the individual droplets deviates too greatly from one another, this is manifested in an uneven printed image.

The resulting pixel size is dependent on the viscosity of the adhesive 3. For optimum printability of the adhesive 3, its viscosity ought preferably to be 5 mPas to 20 mPas, more preferably 10 mPas to 15 mPas.

In order to ensure consistent viscosity of the adhesive 3, the inkjet printhead 13 or the adhesive supply system must be heated. For the stated viscosity, the adhesive temperature in operation must be 40° C. to 45° C.

Droplet flight and incidence on the foil 2 causes an increase, as a result of cooling, in the viscosity of the adhesive droplets 3, likely to 20 mPas to 50 mPas. An increase in viscosity of this kind counteracts any running or spreading of the adhesive 3 on the primer layer of the foil 2.

The adhesive 3 employed preferably is a UV-curing ink for use in piezoelectric drop-on-demand inkjet printheads, and in particular may be transparent or translucent or else transparently or translucently or opaquely colored, being colored grey or black, for example. By energy input in the form of UV light, a radical chain reaction is triggered in an adhesive 3 of this kind (or else varnish, glue). In this reaction, polymers and monomers combine to form a solid network of molecules. The adhesive 3 becomes hard or dry. This chain reaction is triggered by UV light in a wavelength range from 350 nm to 400 nm±10 nm.

The key difference between the cationically curing adhesive from the prior art in comparison to radically curing systems of this kind is that the cationic mechanism is substantially slower; in other words, through-curing takes longer. For foil application, however, a quick-curing system is needed, since otherwise it would not be possible to apply the foil completely.

In the course of the UV irradiation of cationic adhesives, moreover, an acid is formed which is responsible for the through-curing of the adhesive. Owing to this mechanism, foils and substrates must first, when using cationically curing adhesives, be checked for compatibility for cationic systems, since alkaline or basic substances of some substrate surfaces may influence or prevent the through-curing of the adhesive 3. Moreover, the acid could also have the disadvantageous effect of attacking a metal layer, particularly an aluminum layer in the foil.

Preference is given to using a transparent adhesive with a composition as follows:

| | |
|---|---|
| 2-phenoxyethyl acrylate | 10% to 60%, preferably 25% to 50%; |
| 4-(1-oxo-2-propenyl)morpholine | 5% to 40%, preferably 10% to 25%; |
| exo-1,7,7-trimethylbicyclo[2.2.1]hept-2-yl acrylate | 10% to 40%, preferably 20% to 25%; |
| 2,4,6-trimethylbenzoyldiphenyl phosphine oxide | 5% to 35%, preferably 10% to 25%; |
| dipropylene glycol diacrylate | 1% to 20%, preferably 3% to 10%; |
| urethane acrylate oligomer | 1% to 20%, preferably 1% to 10%; |

The subsequent partial curing of the adhesive 3 by means of the first UV light source 14 (also called UV pinning) takes place, in terms of time and space, almost directly after the printing operation onto the foil. Only in this way is it possible to fix the defined, sharp motif on the primer layer. Fixing is brought about by an increase in viscosity of the adhesive, induced by a partial triggering of the radical chain reaction.

In terms of space, the partial curing takes place preferably 1 cm to 4 cm after the printing in machine direction through the foil, corresponding to a time spacing in machine direction of approximately 0.02 s to 0.25 s.

The first UV light source 14 ought preferably to produce a gross UV irradiation power of 2 W/cm$^2$ to 5 W/cm$^2$, in order to bring the necessary and optimum energy input into the adhesive. 90% of the UV light delivered ought preferably to be in the wavelength spectrum between 380 nm and 420 nm.

This requirement can be met particularly well by LED UV systems, since these systems deliver virtually monochromatic UV light, and the wavelength spectrum delivered is therefore much narrower than in the case of conventional medium-pressure mercury vapor lamps, for which the emitted spectrum encompasses a relatively large wavelength range.

A window of the first UV light source 14, from which the radiation emerges, ought preferably to be about 10 mm to 30 mm in size in the machine direction, in order to allow two-dimensional irradiation of the adhesive 3.

Depending on web velocity and foil velocity of 10 m/min to 30 m/min (or higher), and through absorption and reflection of 50% to 60% of the UV light through the foil 2, the UV irradiation power is reduced. Additionally, the distance between the first UV light source 14 and the foil web reduces the irradiation power delivered, by about 10% for an irradiation distance of 2 mm, for example.

When these factors are taken into account, the adhesive 3 in the case of this method is irradiated with a net UV irradiation power of about 0.7 W/cm$^2$ to 2 W/cm$^2$. This corresponds to a net energy input (dose), for a preferred irradiation time of between 0.056 s (at 10 m/min web velocity with a 10 mm irradiation window) and 0.020 s (30 m/min; 10 mm), into the adhesive 3 of about 8 mJ/cm$^2$ to 112 mJ/cm$^2$, a figure which can be varied according to the partial curing required. This dose may additionally be adapted via the web velocity, since the irradiation time changes as a result.

As already described, the viscosity of the droplets 3 of adhesive on the foil 2 has already increased to likely 20 to 50 mPas prior to the partial curing, as a result of cooling. The partial curing drives change in viscosity further forward. After the partial curing, depending on layer thickness, the droplets have a viscosity of likely 50 mPas to 200 mPas, thereby fixing them reliably on the primer layer.

The motif defined by the adhesive 3 on the foil 2 is now fixed, yet is still moist and can be printed onto the substrate 4 in the next step.

At this point in the operation, the foil 2 with the adhesive 3, which is still wet, with the viscosity mentioned above, is pressed onto the substrate 4. The pressure, in the form of a linear pressing, is generated by a press roll 16 onto the foil 2 and the substrate 4.

The press roll 16 ought to consist of a solid plastic or rubber with a smooth surface, and ought preferably to have a hardness of 70-90 Shore A.

The opposing pressure is provided by an impression roll or else, as shown in FIG. 1, by a solid, flat base.

The impression roll or base is preferably made of a material which has a degree of hardness in the range from 60° Shore A to 95° Shore A, preferably in the range from 80° Shore A to 95° Shore A, and/or a degree of hardness in the range from 450 HV 10 (HV=Vickers hardness) to 520 HV 10, preferably in the range from 465 HV 10 to 500 HV 10. This material, for example, is plastic or silicone, or else a metal such as aluminum or steel. The radius of the press roll 16 and, where appropriate, of the impression roll ought to be 1 cm to 3 cm.

In spatial terms, the pressing of the foil 2 onto the substrate 4 takes place about 10 cm to 30 cm after the partial curing in machine direction, corresponding to a time spacing of around 0.2 s to 1.7 s.

The linear pressing exerted by the press roll 16 ought preferably to take place with a force of between 10 N to 80 N, a figure which may be adapted according to the nature of the substrate.

The foil 2 with the moist adhesive 3 may be applied to various substrates 4. The foil 2 is preferably applied to paper substrates with coated or uncoated surfaces, natural papers, plastics (PE, PP, PET, PS, PC, PVC), acetate laminations, and label materials.

In the case of plastics substrates, there may need to be a pretreatment in order to improve the adhesion of the adhesive 3 on the substrate 4 (e.g., by means of AC corona treatment (AC=Alternating Current), plasma treatment, flaming, or coating with varnishes and/or primers). The smoother the substrate surface, the better the application outcome.

As a result of the partial curing and the associated change in viscosity of the adhesive 3, the application outcomes on rough substrates 4 are significantly improved in comparison to the conventional method without change in viscosity.

After the foil 2 has been pressed onto the substrate 4, the foil 2 with the adhesive 3, which is still moist, remains on the substrate 4 until the adhesive 3 has undergone through-curing, and the carrier ply 22 is peeled off.

In the course of through-curing (post-curing) of the adhesive 3, after application of the foil 2, there is ultimate fixing of the adhesive 3 and hence of the foil 2 on the substrate 4. In this step, the foil 2 bears very closely against the adhesive 3, which is still moist, on the substrate 4, and through through-curing of the adhesive 3 is able to enter into a strong, smooth bond with the substrate 4.

Through-curing takes place under the second UV light source 17, which is preferably in the form of a strong LED UV lamp, which supplies a high irradiation power and ensures complete radical chain reaction within the adhesive 3. The reasons for the use of an LED UV system, and the factors for the irradiation power, have already been described with reference to the pre-curing under the first UV light source 14, and are valid for this operating step as well.

In spatial terms, through-curing takes place about 10 cm to 30 cm after foil application in the machine direction, something which corresponds, depending on web velocity, to a time spacing of about 0.2 s to 1.7 s after application.

The distance between the second UV light source 17 and the foil substrate web is 1 mm to 2 mm, in order to achieve optimum through-curing, but at the same time to prevent physical contact between the second UV light source 17 and the substrate. The irradiation window of the second UV light source 17 in machine direction ought to be 20 mm to 40 mm in size.

The gross UV irradiation power ought to be preferably between 12 W/cm$^2$ to 20 W/cm$^2$, so that the adhesive 3 is fully through-cured at velocities of 10 m/min to 30 m/min (or higher) and with the other factors, already discussed with reference to the pre-curing.

Taking account of these factors, the adhesive 3 in this method is irradiated with a net UV irradiation power of preferably about 4.8 W/cm$^2$ to 8.0 W/cm$^2$. This corresponds to a net energy input (dose), for a preferred irradiation time of between 0.112 s (at 10 m/min web velocity with a 20 mm irradiation window) and 0.040 s (30 m/min; 20 mm), into the adhesive 3 of about 537 mJ/cm$^2$ to 896 mJ/cm$^2$, a figure which can be varied according to the required through-curing.

It should be noted that these values are possible only theoretically (at 100% lamp power). At full power of the second UV light source 17, in the case of the 20 W/cm$^2$ version, for example, and at a low web velocity, 10 m/min, for example, the foil substrate web becomes heated to such an extent that it can catch fire. The net energy input is therefore preferably between 200 mJ/cm$^2$ and 400 mJ/cm$^2$, according to web velocity.

After the through-curing, the foil 2 adheres completely to the adhesive 3, and the adhesive 3 adheres completely to the substrate 4. The carrier ply 22 can now be peeled off.

In spatial terms, the detachment of the carrier ply 22 takes place preferably about 10 cm to 30 cm after the through-curing in machine direction, corresponding to a time spacing of about 0.2-1.7 s, depending on web velocity. The carrier ply 22 for detachment is passed over a roll 18 having a radius of 0.5 cm to 2 cm and is detached radially via the roll 18. The detachment angle ought to be variably adjustable depending on the nature of the substrate. In the regions in which adhesive 3 was applied, the substrate 4 is now enhanced—that is, provided with the transfer ply 21.

Substrates 4 enhanced in this way can be overprinted, in a further operating step, by digital printing and probably also by conventional printing processes (e.g., offset printing, flexographic printing, gravure printing, letter press printing, screen printing). In order to permit in-register production, a register cross may be printed or applied as well. The enhanced substrate 4 is immediately ready for further operating steps or for further processing. The adhesive used attains its optimum through-curing about 24 h after curing by the post-curing UV lamp 17.

Combination with an inkjet and/or digital printing method is particularly useful. In that case the application apparatus 1 may be integrated directly into a flatbed or large-format printer.

Figure 2:
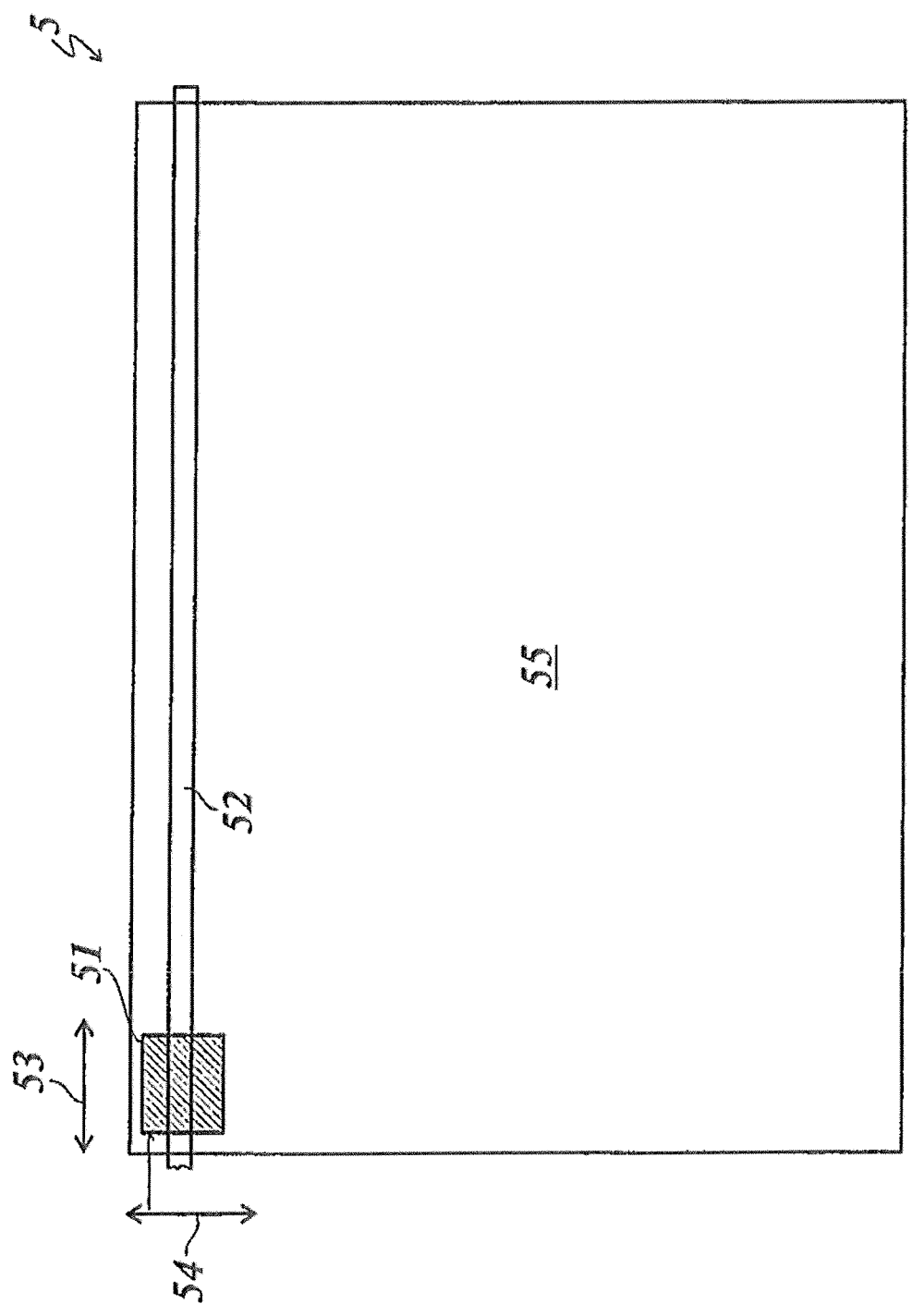
FIG. 2 shows a schematic representation of a flatbed printer according to the prior art.

An exemplary embodiment of a flatbed printer 5 according to the prior art is shown in FIG. 2. An inkjet printhead 51 of the flatbed printer 5 is mounted on a rail 52 and can be moved along this rail in the direction of the arrow 53. The rail 52 itself is movable orthogonally thereto in the direction of the arrow 54, and so the inkjet printhead 51 can be moved freely over a substrate support 55 for substrates 4 in sheet form.

Figure 3:
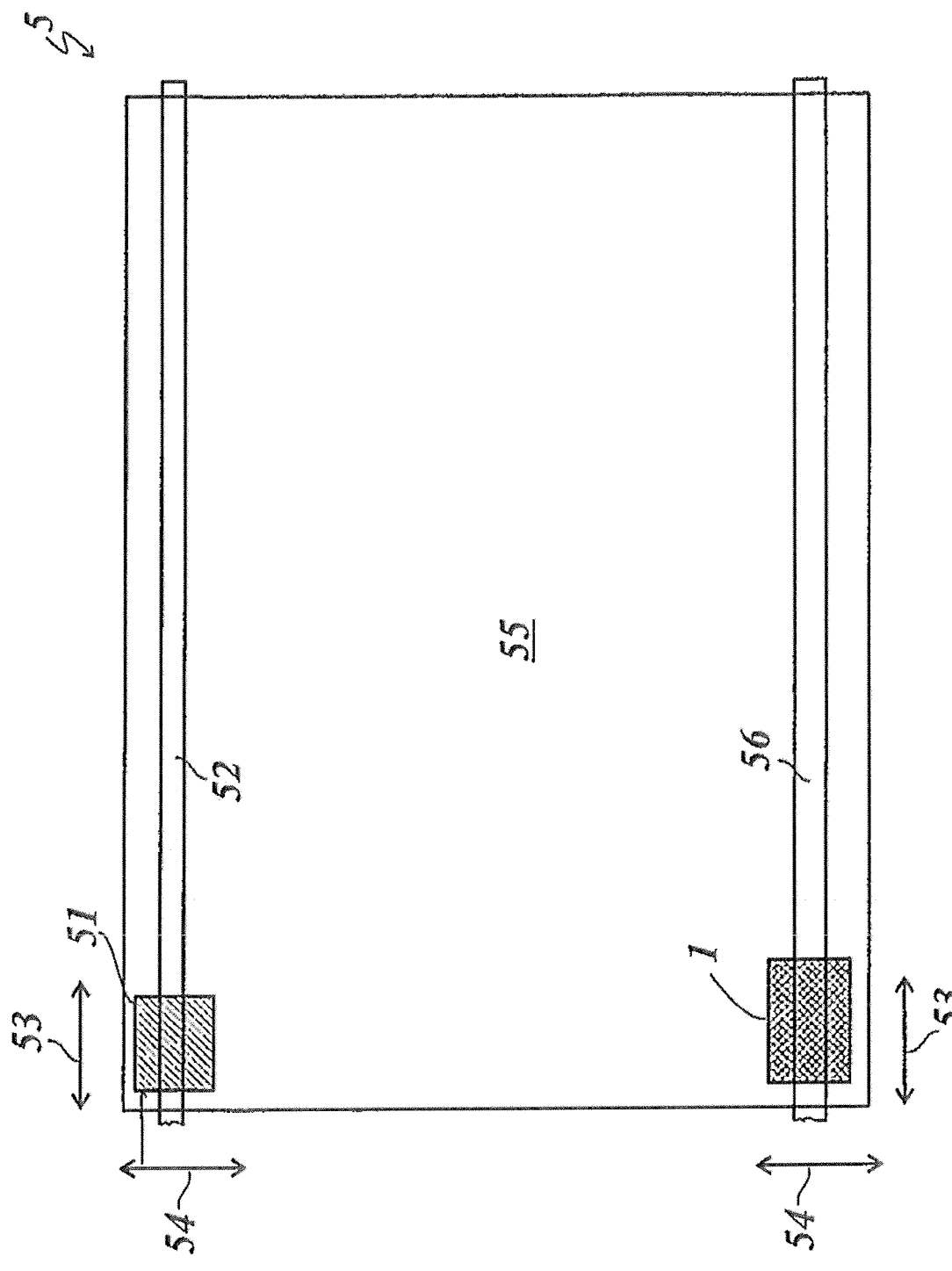
FIG. 3 shows a schematic representation of an exemplary embodiment of a flatbed printer with an application apparatus according to FIG. 1.

As shown by FIG. 3, an application apparatus 1 can be integrated readily into a flatbed printer 5 of this kind. In that case, the application apparatus 1 is disposed on a further rail 56, on which it is movable likewise in the direction of the arrow 53. The rail 56 itself is movable orthogonal thereto, again in the direction of the arrow 54.

As is readily apparent, it is possible in this way for both the inkjet printhead 51 and the application apparatus 1 to pass over a sheet-like substrate 4, disposed on the substrate support 55, at any desired locations. It is therefore possible to combine black or colored inkjet printing with foil application, in which case the inkjet printing may take place both directly onto the substrate 4 and also onto the transfer ply 21 already applied.

Figure 4:
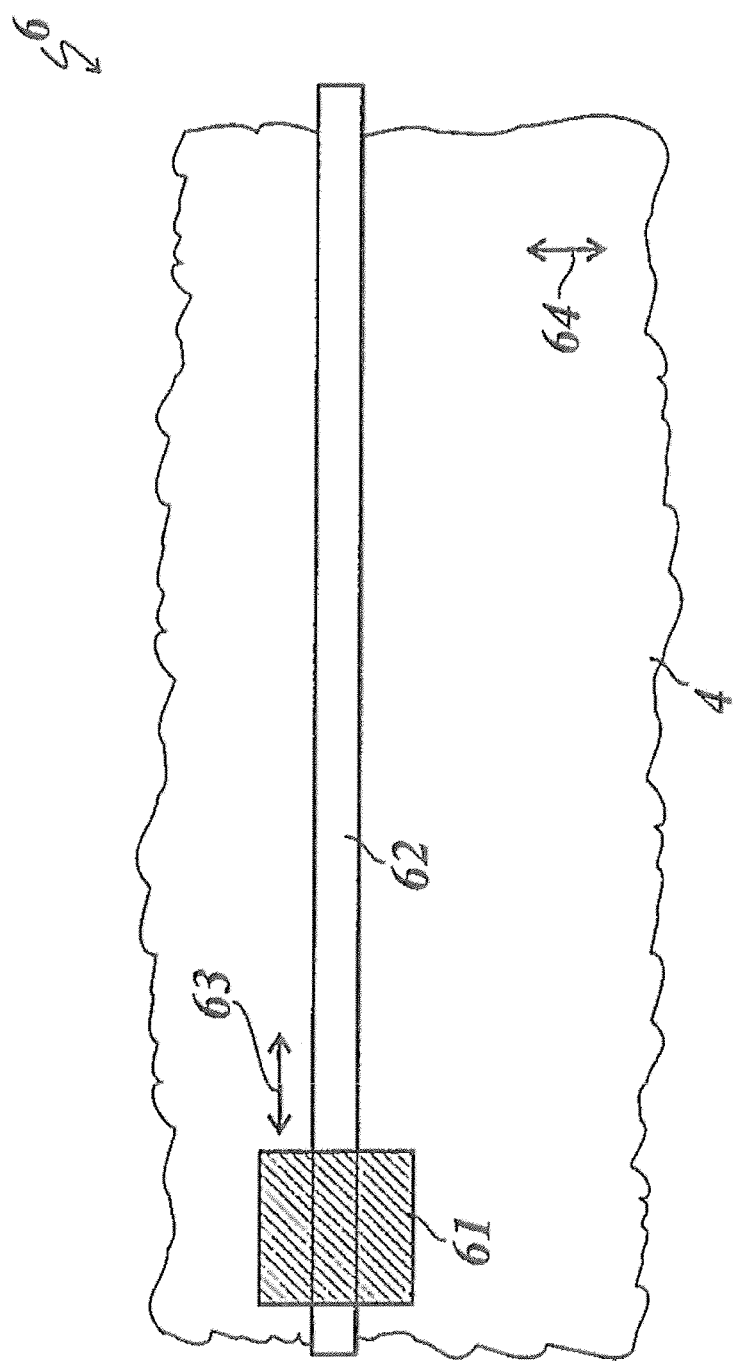
FIG. 4 shows a schematic representation of a large-format printer for processing continuous substrates according to the prior art.

As an alternative to this, an application apparatus 1 can also be integrated into a large-format printer for sheet-like or continuous substrates. An exemplary embodiment of such a printer 6 according to the prior art is shown in FIG. 4.

Here again, an inkjet printhead 61 is disposed on a rail 62 and is movable along said rail in the direction of the arrow 63. In contrast to a flatbed printer 5, the rail 62 in this case is fixed in its location. Instead, the substrate 4 is moved by suitable conveying means relative to the inkjet printhead 61 in the direction of the arrow 64 orthogonally to the direction of movement of the inkjet printhead 61.

Figure 5:
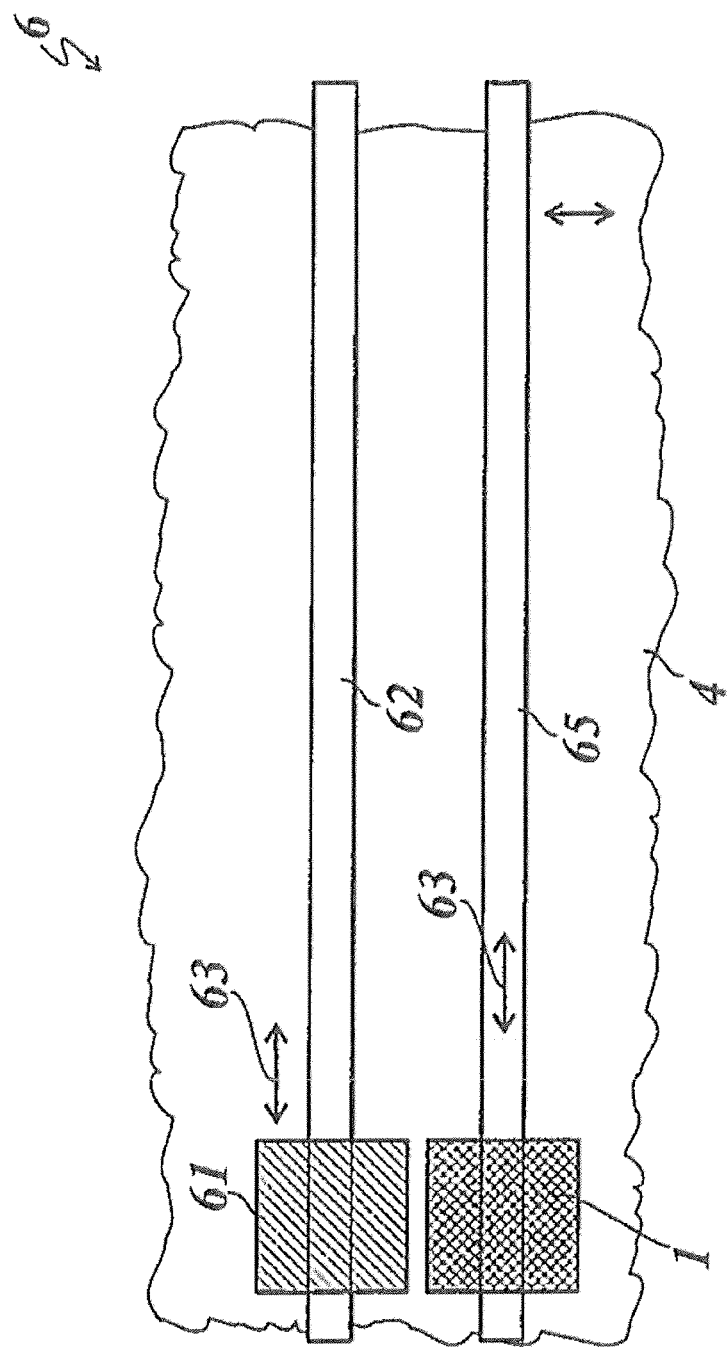
FIG. 5 shows a schematic representation of an exemplary embodiment of a large-format printer for processing continuous substrates with an application apparatus according to FIG. 1.

For the integration of an application apparatus 1, this apparatus, as shown in FIG. 5, is disposed on a further rail 65, which extends parallel to the rail 62. The application apparatus 1 is therefore likewise movable in the direction of the arrow 63 parallel to the inkjet printhead 61. Combined with the substrate movement orthogonally thereto in the direction of the arrow 64, therefore, it is possible here as well for the entire substrate 4 to be passed over both by the inkjet printhead 61 and by the application apparatus 1, so that the printing and application effects already elucidated with reference to the flatbed printer 5 can be achieved. Alternatively, the rail 65 may also be integrated after the inkjet printhead 61, in which case overprinting of the applied transfer ply 21 is no longer possible.

Figure 6:
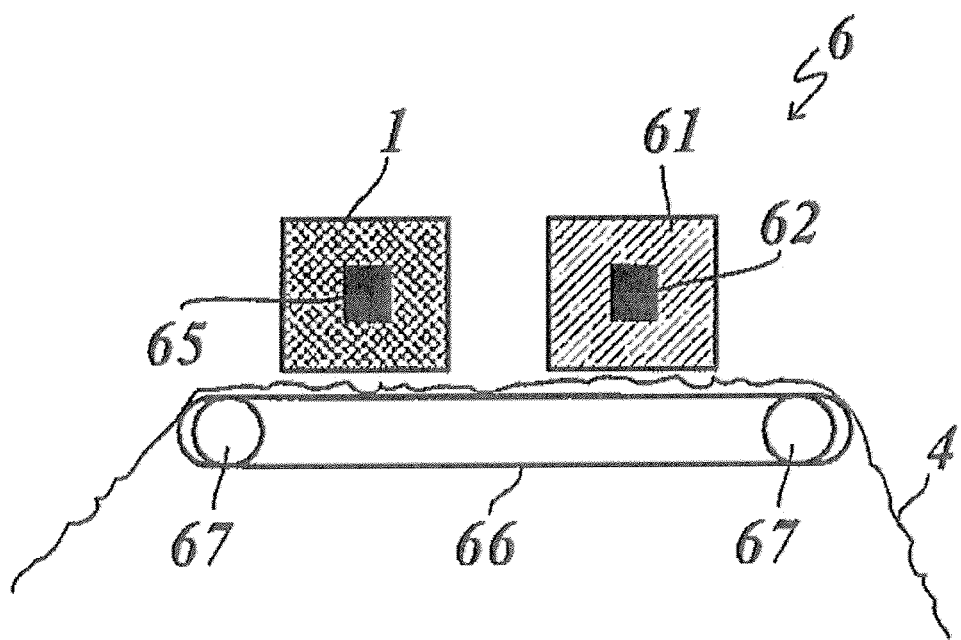
FIG. 6 shows a schematic sectional representation through the exemplary embodiment of a large-format printer according to FIG. 5.

In the schematic cross section, FIG. 6 shows how in this case it is possible, for example, for the substrate movement to be realized. The substrate 4 lies on a circulating steel belt 66, which can be moved backward and forward by two rollers 67. In this case, the steel belt 66 acts simultaneously as a counterpressure unit for the application of the foil with the press roll 16 of the application apparatus 1.

LIST OF REFERENCE NUMERALS

1 Application apparatus
11 Supply roller
12 Guide roller
13 Inkjet printhead
14 First UV light source
15 Deflection roller
16 Press roll
16' Impression roll
17 Second UV light source
18 Roller
19 Roller
2 Foil
21 Transfer ply
22 Carrier ply
23 Detachment layer
24 Varnish layer
25 Metal layer
26 Primer
3 Adhesive
4 Substrate
5 Flatbed printer
51 Inkjet printhead
52 Rail
53 Arrow
54 Arrow
55 Substrate support
56 Rail
6 Large format printer
61 Inkjet printhead
62 Rail
63 Arrow
64 Arrow
65 Rail
66 Steel belt
67 Roller

The invention claimed is:

1. A method for applying a transfer ply of a foil to a substrate, the method comprising:
   a) applying a radically curable adhesive to at least one subregion of the transfer ply by means of an inkjet printhead having a resolution of 300 to 1200 nozzles per inch (npi), wherein the inkjet printhead prints droplets of the adhesive directly on the transfer ply;
   b) pre-curing the adhesive printed on the transfer ply by UV irradiation;
   c) applying the at least one subregion of the transfer ply provided with adhesive to the substrate;
   d) fully curing the adhesive applied to the substrate by UV irradiation;
   e) peeling a carrier ply of the foil from the at least one subregion of the transfer ply.

2. The method as claimed in claim 1, further comprising:
   applying a thermoplastic toner to at least one subregion of the substrate;
   applying the transfer ply to the substrate;
   causing an applied pressure, and heat, to act on the transfer ply;

peeling a carrier ply of the foil from the at least one subregion of the transfer ply.

3. The method as claimed in claim 1, wherein the adhesive is applied using an inkjet printhead having a nozzle diameter of 15 μm to 25 μm with a tolerance of not more than ±5 μm.

4. The method as claimed in claim 1, wherein the adhesive is applied with a weight per unit area of 0.5 g/m² to 20 g/m² to the at least one subregion.

5. The method as claimed in claim 1, wherein the inkjet printhead provides droplets of adhesive with a frequency of 6 kHz to 110 kHz.

6. The method as claimed in claim 1, wherein the inkjet printhead provides droplets of adhesive with a volume of 2 to 50 picoliters (pl) with a tolerance of not more than ±6%.

7. The method as claimed in claim 1, wherein the inkjet printhead provides droplets of adhesive with a flight velocity of 5 m/s to 10 m/s with a tolerance of not more than ±15%.

8. The method as claimed in claim 1, wherein the adhesive is applied with an application temperature of 40° C. to 45° C. to the transfer ply.

9. The method as claimed in claim 1, wherein a distance between inkjet printhead and substrate during application of the adhesive does not exceed 1 mm.

10. The method as claimed in claim 1, wherein a relative velocity between inkjet printhead and transfer ply during application of the adhesive is 10 m/min to 30 m/min.

11. The method as claimed in claim 1, wherein an adhesive having an density of 1 g/ml to 1.5 g/ml is used.

12. The method as claimed in claim 1, wherein the pre-curing of the adhesive takes place at 0.02 s to 0.025 s after the application of the adhesive.

13. The method as claimed in claim 1, wherein the pre-curing of the adhesive takes place with UV light at least 90% of whose energy is emitted in the wavelength range between 380 nm and 420 nm.

14. The method as claimed in claim 1, wherein the pre-curing of the adhesive takes place with a gross irradiation power of 2 W/cm² to 5 W/cm².

15. The method as claimed in claim 1, wherein the pre-curing of the adhesive takes place with an exposure time of 0.02 s to 0.056 s.

16. The method as claimed in claim 1, wherein the pre-curing of the adhesive is accompanied by an increase in its viscosity to 50 mPas to 200 mPas.

17. The method as claimed in claim 1, wherein the application of the at least one subregion of the transfer ply provided with adhesive to the substrate takes place between a press roll and an impression roll.

18. The method as claimed in claim 1, wherein the application of the at least one subregion of the transfer ply provided with adhesive to the substrate takes place with an applied pressure of 10 N to 80 N.

19. The method as claimed in claim 1, wherein the application of the at least one subregion of the transfer ply provided with adhesive to the substrate takes place 0.2 s to 1.7 s after the pre-curing of the adhesive.

20. The method as claimed in claim 1, wherein the substrate, before the application of the at least one subregion of the transfer ply provided with adhesive, is pretreated by a corona treatment, a plasma treatment or by flaming.

21. The method as claimed in claim 1, wherein the full curing of the adhesive takes place at 0.2 s to 1.7 s after the application of the transfer ply to the substrate.

22. The method as claimed in claim 1, wherein the full curing of the adhesive takes place with UV light at least 90% of whose energy is emitted in the wavelength range between 380 nm and 420 nm.

23. The method as claimed in claim 1, wherein the full curing of the adhesive takes place with a gross irradiation power of 12 W/cm² to 20 W/cm².

24. The method as claimed in claim 1, wherein the full curing of the adhesive takes place with an exposure time of 0.04 s to 0.112 s.

25. The method as claimed in claim 1, wherein the detachment of the carrier ply takes place 0.2 s to 1.7 s after the full curing of the adhesive.

26. The method as claimed in claim 1, wherein the application of the transfer ply to the substrate takes place by means of a thermoplastic toner at a temperature of 100° C. to 250° C.

27. The method as claimed in claim 1, wherein the application of the transfer ply to the substrate is carried out by means of a thermoplastic toner in a roll arrangement with a press nip of 5 mm to 20 mm.

28. The method as claimed in claim 1, wherein a foil is used whose transfer ply has a detachment layer of an aqueous polyurethane copolymer free from wax and/or silicone, with a layer thickness of 0.01 μm to 2 μm, which is disposed on a surface of the carrier ply.

29. The method as claimed in claim 28, wherein a foil is used whose transfer ply has a varnish layer of nitrocellulose, polyacrylate and/or polyurethate copolymer with a layer thickness of 0.1 μm to 5 μm, which is disposed on a detachment layer surface facing away from the carrier ply.

30. The method as claimed in claim 29, wherein a foil is used whose transfer ply has a metal layer comprising at least one of aluminum, chromium silver gold or copper with a layer thickness of 10 nm to 200 nm, which is disposed on a varnish layer surface facing away from the carrier ply.

31. The method as claimed in claim 1, wherein a foil is used whose transfer ply has a primer layer of polyacrylates with a layer thickness of 0.1 μm to 1.5 μm, which forms a transfer ply surface facing away from the carrier ply.

32. The method as claimed in claim 31, wherein the primer layer is microporous.

33. The method as claimed in claim 31, wherein the primer layer has a surface tension of 38 mN/m to 46 mN/m.

34. The method as claimed in claim 31, wherein the primer layer has a pigmentation number of 0.5 cm³/g to 120 cm³/g.

35. The method as claimed in claim 31, wherein the primer layer has a melting point of 60° C. to 130° C.

36. The method as claimed in claim 1, wherein, before the application of the transfer ply, a print layer is applied by means of a further inkjet printhead to the substrate.

37. The method as claimed in claim 1, wherein the transfer ply is applied to a three-dimensional, domed, curved, cylindrical or flat substrate.

38. The method as claimed in claim 37, wherein the transfer ply is applied using a pressing apparatus which is transparent for a wavelength used for the pre-curing of the adhesive.

39. The method as claimed in claim 37, wherein the substrate, during the application of the transfer ply, is mounted rigidly or rotatably on a holding means which is transparent for a wavelength used for the pre-curing of the adhesive.

40. The method as claimed in claim 37, wherein the pre-curing of the adhesive is effected by irradiating it using a light source disposed within the pressing apparatus and or a light source disposed on the side of the pressing apparatus that faces away from the holding means.

41. The method as claimed in claim 38, wherein the pressing means has a pressing layer which is formed of one or more silicone plies and has a thickness in the range from 1 mm to 20 mm.

42. The method as claimed in claim 41, wherein the pressing layer has a surface structure in the form of a pattern or decoration.

43. The method as claimed in claim 38, wherein the transfer ply is applied with an applied force of 1 N to 1000 N.

44. The method as claimed in claim 37, wherein the transfer ply is applied using a pressing apparatus which is transparent for a wavelength used for the full curing of the adhesive.

45. The method as claimed in claim 37, wherein the substrate, during the application of the transfer ply, is mounted rigidly or rotatably on a holding means which is transparent for a wavelength used for the full curing of the adhesive.

46. The method as claimed in claim 37, wherein the full curing of the adhesive is effected by irradiating it using a light source disposed within the pressing apparatus and or a light source disposed on the side of the pressing apparatus that faces away from the holding means.

47. The method as claimed in claim 38, wherein the pressing means has a pressing layer which is formed of one or more silicone plies and has a hardness of 20° Shore A to 70° Shore A.

48. The method as claimed in claim 38, wherein the pressing means has a pressing layer which is formed of one or more silicone plies and has a surface roughness (mean roughness value) of between 0.06 μm and 0.5 μm.

49. The method as claimed in claim 38, wherein the holding means has a pressing layer which is formed of one or more silicone plies and has a thickness in the range from 1 mm to 20 mm.

50. The method as claimed in claim 38, wherein the holding means has a pressing layer which is formed of one or more silicone plies and has a hardness of 20° Shore A to 70° Shore A.

51. The method as claimed in claim 38, wherein the holding means has a pressing layer which is formed of one or more silicone plies and has a surface roughness (mean roughness value) of between 0.06 μm and 0.5 μm.

52. An application apparatus for applying a transfer ply of a foil to a substrate by means of a method as claimed in claim 1 comprising:
a supply roller for providing the foil;
an inkjet printhead disposed downstream of the supply roller in the conveying direction of the foil, for applying a radically curable adhesive, to at least one subregion of the transfer ply;
a first UV light source, disposed downstream of the inkjet printhead in the conveying direction of the foil, for pre-curing the adhesive by UV irradiation;
at least one roll arrangement, disposed downstream of the inkjet printhead in the conveying direction of the foil, for applying the at least one subregion of the transfer ply provided with adhesive to the substrate;
a second UV light source, disposed downstream of the roll arrangement in the conveying direction of the foil, for fully curing the adhesive by UV irradiation;
a peeling unit disposed downstream of the roll arrangement in the conveying direction of the foil, for peeling a carrier ply of the foil from the at least one subregion of the transfer ply.

53. The application apparatus as claimed in claim 52, wherein the inkjet printhead has a resolution of 300 to 1200 nozzles per inch (npi).

54. The application apparatus as claimed in claim 52, wherein the inkjet printhead has a nozzle diameter of 15 μm to 25 μm with a tolerance of not more than ±5 μm.

55. The application apparatus as claimed in claim 52, wherein the first UV light source is an LED light source.

56. The application apparatus as claimed in claim 52, wherein the first UV light source in the conveying direction of the foil has a window width of 10 mm to 30 mm.

57. The application apparatus as claimed in claim 52, wherein the first UV light source in the conveying direction of the foil is disposed 1 cm to 4 cm downstream of the inkjet printhead.

58. The application apparatus as claimed in claim 52, wherein the roll arrangement comprises a press roll and a mechanical counterbearing.

59. The application apparatus as claimed in claim 58, wherein the press roll has a diameter of 1 cm to 3 cm.

60. The application apparatus as claimed in claim 58, wherein the press roll is formed from a plastic or rubber having a hardness of 70 Shore A to 90 Shore A.

61. The application apparatus as claimed in claim 58, wherein the counterbearing is formed of a material having a hardness of 60° Shore A to 95° Shore A.

62. The application apparatus as claimed in claim 58, wherein the counterbearing is designed as a sonotrode of an ultrasonic bearing means.

63. The application apparatus as claimed in claim 58, wherein the roll arrangement comprises an infrared heater, an electrical heating element disposed within the press roll, or a heating-medium circuit disposed within the press roll.

64. The application apparatus as claimed in claim 52, wherein the roll arrangement is disposed at a distance of 10 cm to 30 cm from the first UV light source.

65. The application apparatus as claimed in claim 52, wherein the second UV light source is an LED light source.

66. The application apparatus as claimed in claim 52, wherein the second UV light source in the conveying direction of the foil has a window width of 20 mm to 40 mm.

67. The application apparatus as claimed in claim 52, wherein the second UV light source in the conveying direction of the foil is disposed 10 cm to 30 cm downstream of the roll arrangement.

68. The application apparatus as claimed in claim 52, wherein the peeling unit has a roll having a diameter of 0.5 cm to 2 cm over which the carrier ply can be peeled off.

69. The application apparatus as claimed in claim 52, wherein the peeling unit in the conveying direction of the foil is disposed 10 cm to 30 cm downstream of the second UV light source.

70. A printing apparatus having an inkjet printhead which is disposed movably in two orthogonal directions relative to a substrate to be printed, and also with an application apparatus as claimed in claim 52 which is disposed movably in two orthogonal directions relative to the substrate to be printed.

71. The printing apparatus as claimed in claim 70, wherein the printing apparatus has a support surface for the fixing of a substrate in sheet form.

72. The printing apparatus as claimed in claim 71, wherein the inkjet printhead is disposed on a respective carriage which is movable in two orthogonal directions relative to the substrate to be printed.

73. The printing apparatus as claimed in claim 70, wherein the printing apparatus has a conveying apparatus for the relative moving of a substrate in sheet form or of a continuous substrate relative to the inkjet printhead and the application apparatus.

74. The printing apparatus as claimed in claim 73, wherein the inkjet printhead is disposed on a respective carriage which is movable orthogonally to a conveying direction of the substrate to be printed.

75. The printing apparatus as claimed in claim 73, wherein the conveying apparatus is designed as a steel belt circulating around two rolls.

76. An application apparatus for applying a transfer ply of a foil to a substrate by means of a method as claimed in claim 1 comprising:
   a supply roller for providing the foil;
   a printing apparatus disposed downstream of the supply roller in the conveying direction of the foil, for applying a thermoplastic toner to at least one subregion of the transfer ply;
   a first UV light source, disposed downstream of the printing apparatus in the conveying direction of the foil, for pre-curing the adhesive by UV irradiation;
   at least one roll arrangement, disposed downstream of the printing apparatus in the conveying direction of the foil, for applying the at least one subregion of the transfer ply provided with toner to the substrate;
   a second UV light source, disposed downstream of the roll arrangement in the conveying direction of the foil, for fully curing the adhesive by UV irradiation;
   a peeling unit disposed downstream of the roll arrangement in the conveying direction of the foil, for peeling a carrier ply of the foil from the at least one subregion of the transfer ply.

77. The application apparatus as claimed in claim 52, wherein the inkjet printhead has a nozzle spacing of 50 μm to 150 μm with a tolerance of not more than ±5 μm.

78. The application apparatus as claimed in claim 58, wherein the mechanical counterbearing comprises an impression roll.

79. The application apparatus as claimed in claim 58, wherein the counterbearing is formed of a material having a degree of hardness of 450 HV 10 to 520 HV 10.

80. The application apparatus as claimed in claim 79, wherein the impression roll has a diameter of 1 cm to 3 cm.

81. The printing apparatus as claimed in claim 71, wherein the application apparatus is disposed on a respective carriage which is movable in two orthogonal directions relative to the substrate to be printed.

82. The printing apparatus as claimed in claim 73 wherein the application apparatus is disposed on a respective carriage which is movable orthogonally to a conveying direction of the substrate to be printed.

83. The method as claimed in claim 1, further comprising:
   applying a thermoplastic toner to at least one subregion of the substrate;
   applying the transfer ply to the substrate;
   causing an applied pressure, and heat, to act on the substrate;
   peeling a carrier ply of the foil from the at least one subregion of the transfer ply.

84. The method as claimed in claim 1, further comprising:
   applying a thermoplastic toner to at least one subregion of a transfer ply of a further foil;
   applying the transfer ply to the substrate;
   causing an applied pressure, and heat, to act on the transfer ply;
   peeling a carrier ply of the foil from the at least one subregion of the transfer ply.

85. The method as claimed in claim 1, further comprising:
   applying a thermoplastic toner to at least one subregion of a transfer ply of a further foil;
   applying the transfer ply to the substrate;
   causing an applied pressure, and heat, to act on the substrate;
   peeling a carrier ply of the foil from the at least one subregion of the transfer ply.

86. The method as claimed in claim 1, wherein the adhesive is applied using an inkjet printhead having a nozzle spacing of 50 μm to 150 μm with a tolerance of not more than ±5 μm.

87. The method as claimed in claim 1, wherein the adhesive is applied with a layer thickness of 0.5 μm to 20 μm to the at least one subregion.

88. The method as claimed in claim 1, wherein the adhesive is applied with a viscosity of 5 mPas to 20 mPas to the transfer ply.

89. The method as claimed in claim 1, wherein the pre-curing of the adhesive takes place with a net irradiation power of 0.7 W/cm$^2$ to 2 W/cm$^2$.

90. The method as claimed in claim 1, wherein the pre-curing of the adhesive takes place with an energy input into the adhesive of 8 mJ/cm$^2$ to 112 mJ/cm$^2$.

91. The method as claimed in claim 1, wherein the full curing of the adhesive takes place with a net irradiation power of 4.8 W/cm$^2$ to 8 W/cm$^2$.

92. The method as claimed in claim 1, wherein the full curing of the adhesive takes place with an energy input into the adhesive of 200 mJ/cm$^2$ to 900 mJ/cm$^2$.

93. The method as claimed in claim 1, wherein the application of the transfer ply to the substrate takes place by means of a thermoplastic toner at an applied pressure of 1 bar to 6 bar.

94. The method as claimed in claim 1, wherein a foil is used whose transfer ply has a primer layer of vinyl aceto copolymers with a layer thickness of 0.1 μm to 1.5 μm, which forms a transfer ply surface facing away from the carrier ply.

95. The method as claimed in claim 1, wherein, after the application of the transfer ply, a print layer is applied by means of a further inkjet printhead to the substrate.

96. The method as claimed in claim 1, wherein, before the application of the transfer ply, a print layer is applied by means of a further inkjet printhead to the transfer ply.

97. The method as claimed in claim 1, wherein, after the application of the transfer ply, a print layer is applied by means of a further inkjet printhead to the transfer ply.

98. A method for applying a transfer ply of a foil to a substrate, the method comprising:
   a) applying a radically curable adhesive to at least one subregion of the transfer ply by means of an inkjet printhead, wherein the inkjet printhead prints droplets of the adhesive directly on the transfer ply with a volume of 2 to 50 picoliters (pl) with a tolerance of not more than +/−6%;
   b) pre-curing the adhesive printed on the transfer ply by UV irradiation;
   c) applying the at least one subregion of the transfer ply provided with adhesive to the substrate;
   d) fully curing the adhesive applied to the substrate by UV irradiation;
   e) peeling a carrier ply of the foil from the at least one subregion of the transfer ply.

* * * * *